US009507033B2

(12) United States Patent
Rothfuss et al.

(10) Patent No.: US 9,507,033 B2
(45) Date of Patent: Nov. 29, 2016

(54) METHOD AND APPARATUS FOR COMPENSATING FOR SCATTERING OF EMISSION GAMMA PHOTONS FOR PET IMAGING

(71) Applicant: Siemens Medical Solutions USA, Inc, Malvern, PA (US)

(72) Inventors: Harold E. Rothfuss, Knoxville, TN (US); Vladimir Y. Panin, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 0 days.

(21) Appl. No.: 14/688,435

(22) Filed: Apr. 16, 2015

(65) Prior Publication Data
US 2015/0241576 A1    Aug. 27, 2015

Related U.S. Application Data

(63) Continuation-in-part of application No. 14/172,980, filed on Feb. 5, 2014, now abandoned.

(60) Provisional application No. 61/982,010, filed on Apr. 21, 2014, provisional application No. 61/760,911, filed on Feb. 5, 2013.

(51) Int. Cl.
  *G01T 1/20*  (2006.01)
  *G01T 1/29*  (2006.01)
  *G01T 1/161* (2006.01)

(52) U.S. Cl.
  CPC .......... *G01T 1/2985* (2013.01); *G01T 1/1617* (2013.01)

(58) Field of Classification Search
  CPC .................. G01T 1/2985; G01T 1/1617
  USPC ......................................... 250/362
  See application file for complete search history.

(56) References Cited

U.S. PATENT DOCUMENTS 7,180,074 B1 *  2/2007  Crosetto ............. G01T 1/1611
                                                    250/370.09
7,417,231 B2    8/2008  Defrise et al.
7,848,559 B2   12/2010  DeFrise et al.
7,876,941 B2    1/2011  Panin et al.

(Continued)

OTHER PUBLICATIONS

V.Y. Panin, et al., "Simultaneous reconstruction of emission activity and attenuation coefficient distribution from TOF data, acquired with external transmission source," Phys. Med. Biol. 58 (2013) 3649-3669.

(Continued)

*Primary Examiner* — Mark R Gaworecki
*Assistant Examiner* — Taeho Jo

(57) ABSTRACT

A process for operating a PET scanner includes acquiring, at a plurality of detector blocks of the PET scanner, emission data of gamma photons of a first energy level originating from annihilation events associated with radioactivity of a phantom in a field of view of the PET scanner. Based on the emission data, an emission block-pair scattering model is generated. The process includes acquiring counts of gamma photons of a second energy level originating from intrinsic background radiation of scintillator crystals of the detector blocks, without any phantom in the field of view, to provide blank scan data for the second energy level. A sinogram is generated based on the blank scan data for the second energy level. The emission block-pair scattering model is added to a scaled version of the sinogram to yield a composite model.

20 Claims, 38 Drawing Sheets

(56) References Cited

U.S. PATENT DOCUMENTS

| | | | |
|---|---|---|---|
| 8,059,880 B2 | 11/2011 | Mizuta et al. | |
| 8,488,849 B2* | 7/2013 | Hu | G06K 9/00362 382/128 |
| 2002/0075992 A1 | 6/2002 | Jiang | |
| 2003/0047687 A1* | 3/2003 | Wollenweber | G01T 1/1644 250/363.03 |
| 2006/0151705 A1* | 7/2006 | Manjeshwar | A61B 6/037 250/363.03 |
| 2007/0040122 A1* | 2/2007 | Manjeshwar | G01T 1/2985 250/363.03 |
| 2007/0183642 A1* | 8/2007 | Ye | G06T 11/006 382/131 |
| 2007/0253530 A1* | 11/2007 | Mihailescu | G01T 1/2985 378/22 |
| 2008/0283758 A1* | 11/2008 | Hayden, Jr. | G01T 1/2985 250/362 |
| 2009/0078876 A1* | 3/2009 | Chinn | G01T 1/2985 250/363.04 |
| 2009/0097613 A1* | 4/2009 | Tonami | G01T 1/1644 378/19 |
| 2009/0169082 A1* | 7/2009 | Mizuta | G01T 1/1612 382/131 |
| 2010/0116994 A1* | 5/2010 | Wollenweber | G01T 1/1648 250/363.03 |
| 2011/0007958 A1* | 1/2011 | Salomon | G06T 7/0081 382/131 |
| 2011/0150306 A1* | 6/2011 | Ross | A61B 6/032 382/131 |
| 2011/0210255 A1* | 9/2011 | Kim | G01T 1/2985 250/362 |
| 2012/0068076 A1* | 3/2012 | Daghighian | A61B 6/037 250/363.03 |
| 2012/0290519 A1* | 11/2012 | Fontaine | G01T 1/2985 706/20 |

OTHER PUBLICATIONS

Charles C. Watson, et al., "NEMA NU 2 Performance Tests for Scanners with Intrinsic Radioactivity," The Journal of Nuclear Medicine, vol. 45, No. 5, May 2004.

Laszlo Szecsi, et al., "Binned Time-of-Flight Positron Emission Tomography," KEPAF 2013.

H, Rothfuss et al., "Time Alignment of Time of Flight Positron Emission Tomography using the Background Activity of LSO," IEEE NSS-MIC Conference Record, 2013.

C. Watson, "New, Faster, Image Based Scatter Correction for 3D PET", IEEE TNS 47, 4, 1587-1594, 2000.

Klein, O and Nishina, Y, "Über die Streuung von Strahlung durch freie Elektronen nach der neuen relativistischen Quantendynamik von Dirac," Z. Phys. 52 (11-12): 853-68 (1929).

* cited by examiner

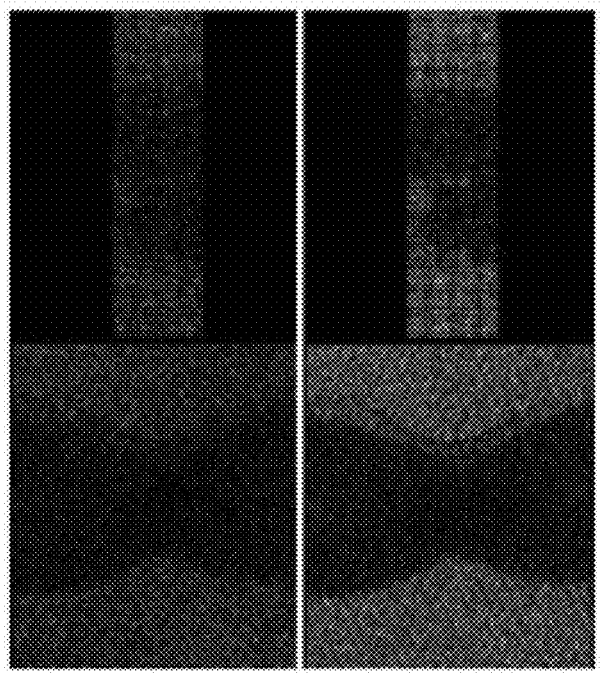
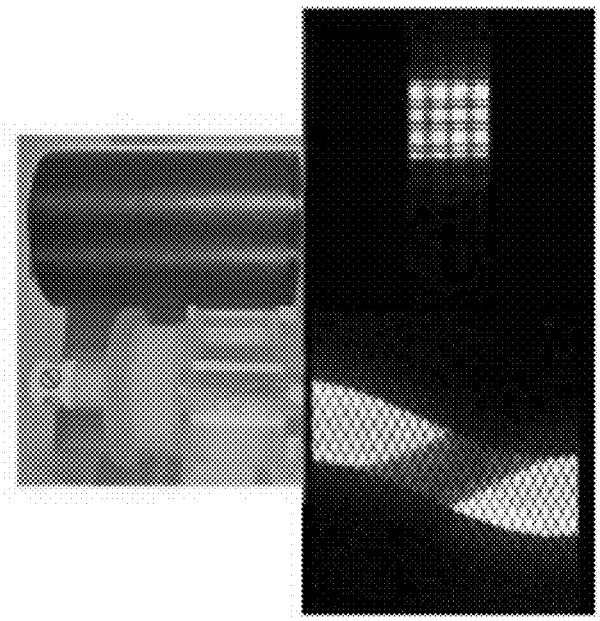
FIG. 6B  FIG. 6D  FIG. 6A  FIG. 6C

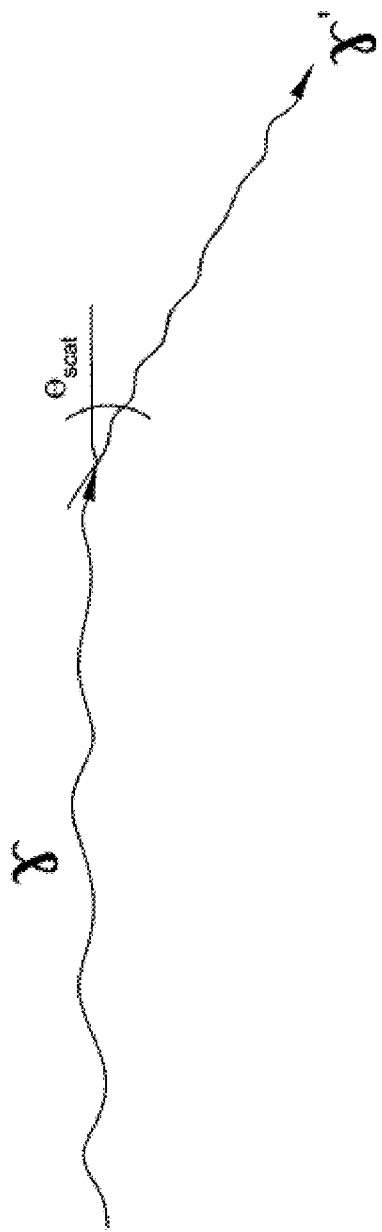

METHOD AND APPARATUS FOR COMPENSATING FOR SCATTERING OF EMISSION GAMMA PHOTONS FOR PET IMAGING

CROSS-REFERENCE TO RELATED APPLICATIONS

This application is a continuation-in-part of U.S. application Ser. No. 14/172,980 filed Feb. 5, 2014, the entirety of which is hereby incorporated by reference herein, which claims priority from U.S. Provisional Application Ser. No. 61/760,911 filed Feb. 5, 2013, the entirety of which is hereby incorporated by reference herein, and this application claims priority under 35 U.S.C. §119(e) from U.S. Provisional Application Ser. No. 61/982,010 filed Apr. 20, 2014, the entirety of which is hereby incorporated by reference herein.

FIELD

The present disclosure generally relates to nuclear medicine, and systems for obtaining nuclear medicine images. In particular, the present disclosure relates to positron emission tomography (PET) utilizing lutetium-based scintillators, improvements thereof, and compensation for scattering of emission photons that would otherwise degrade transmission images.

BACKGROUND

The combination of PET imaging and x-ray computed tomography (CT) imaging in integrated PET/CT or PET-CT medical imaging systems provide more precisely aligning or correlating the functional imaging obtained by PET with anatomic imaging obtained by CT scanning. However, such integrated PET/CT medical imaging systems require the additional CT scanning hardware to be integrated with the PET imaging hardware. Thus, it would be useful if a transmission type scan data can be obtained using a PET scanner without the additional transmission scanning hardware such as a CT scanner.

General information about PET imaging may be found in U.S. Pat. No. 7,848,559 to Defrise et al. and U.S. Pat. No. 7,876,941 to Panin et al., both of which are incorporated herein by reference in their entirety.

SUMMARY

In some embodiments of the present disclosure, a process for operating a PET scanner includes acquiring, at a plurality of detector blocks of the PET scanner, emission data of gamma photons of a first energy level originating from annihilation events associated with radioactivity of a phantom in a field of view of the PET scanner. Based on the emission data, an emission block-pair scattering model is generated. The process includes acquiring counts of gamma photons of a second energy level originating from intrinsic background radiation of scintillator crystals of the detector blocks, without any phantom in the field of view, to provide blank scan data for the second energy level. A sinogram is generated based on the blank scan data for the second energy level. The emission block-pair scattering model is added to a scaled version of the sinogram to yield a composite model.

In some embodiments, a process for operating a PET scanner includes acquiring, at a plurality of detector blocks of the PET scanner, emission data of 511 keV gamma photons originating from annihilation events associated with radioactivity of a phantom in a field of view of the PET scanner. Based on the emission data, a histogram of counts of 511 keV gamma photons detected at respective detector blocks over a range of incident angles is computed. A probability of scatter is computed for 511 keV gamma photons as a function of scattering angle for each pair of detector blocks of the scanner, to obtain a set of scatter probabilities. For a given gamma photon scattering at each detector block, a probability of scattering to each other detector block in a subset of the plurality of detector blocks is computed, to provide detector block impact probabilities. The computed histogram of counts is scaled by the scatter probabilities and the block impact probabilities, to generate an emission block-pair scattering model.

In some embodiments, a machine-readable storage medium tangibly embodies a program of instructions executable by a system controller to cause the system controller to perform operations of one or more processes described above.

BRIEF DESCRIPTION OF THE DRAWINGS

The following will be apparent from elements of the figures, which are provided for illustrative purposes and are not necessarily to scale.

FIG. 6A shows a photograph of the experimental setup with hot uniform phantom and cold CT calibration phantom.

FIGS. 6B-6D show the corresponding sinograms.

FIG. 17A is an illustration of a scattering scenario.

DETAILED DESCRIPTION

Figure 1:
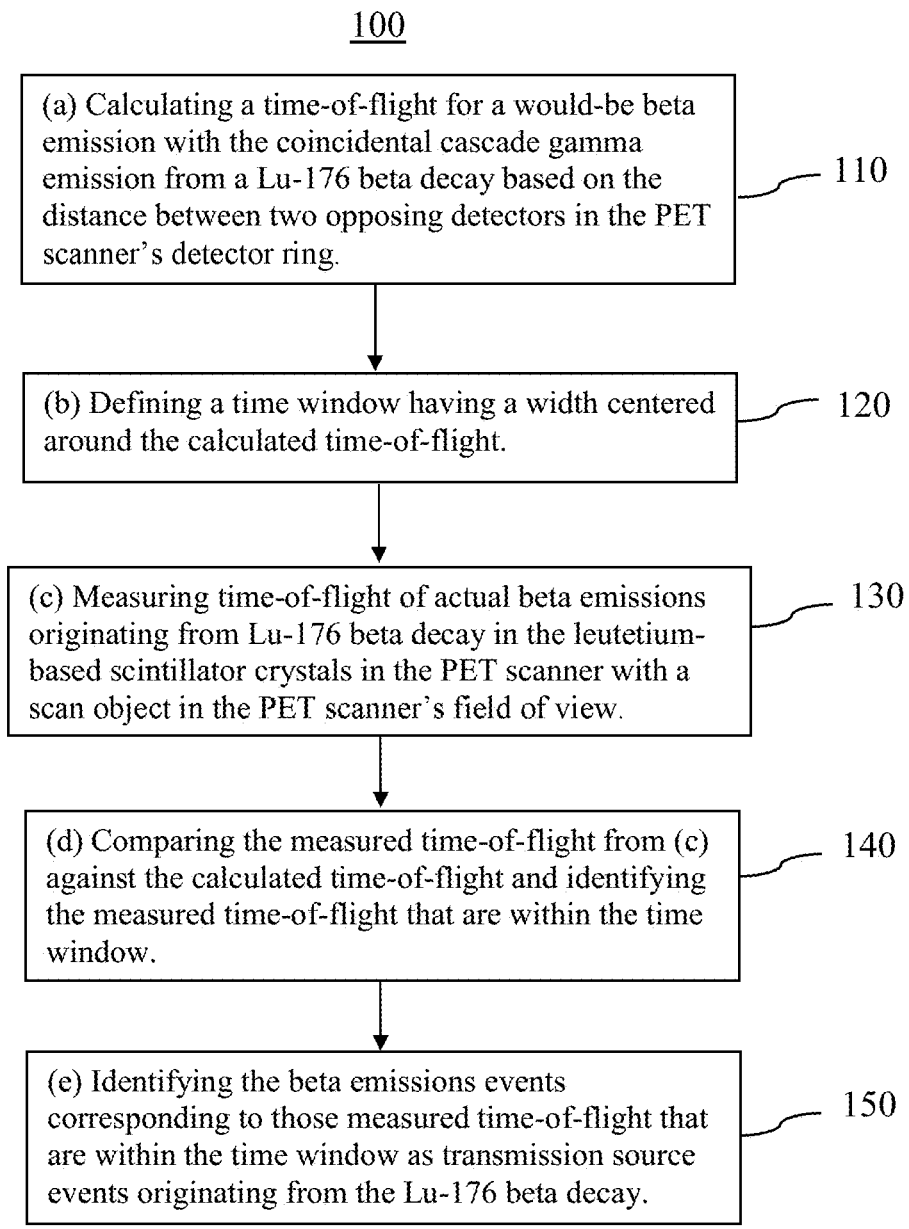
FIG. 1 is a flowchart illustrating a process in accordance with some embodiments of the present disclosure.

This description of the exemplary embodiments is intended to be read in connection with the accompanying drawings, which are to be considered part of the entire written description.

PET emission data as collected in a traditional PET scan includes all information of the physical effects that emission photons undergo prior to detection in a detector. To reconstruct the collected emission data, corrections to the emission data are performed in order to reconstruct the true measured emission events. System corrections such as normalization, randoms and dead time corrections are independent of the object in the field of view (FOV) and are primarily dependent on the system and count rates of the activities that illuminate the PET detectors in and out of the FOV. Other corrections are object dependent such as the attenuation correction and scatter estimation and require attenuation information of the object's material in the scanner's FOV. This attenuation information is commonly collected separately from the PET emission acquisition using methods such as conducting separate CT transmission scans within the PET FOV or by a coupled modality as performed in the integrated PET/CT scans.

Such separate CT transmission scan is used in conventional PET scanner to generate an attenuation map that can be used to correct the attenuation effect in the emission PET scan data. Because of the lower photon energy of the CT x-rays (100-140 kVp), the CT attenuation coefficients are scaled to reflect the attenuation of the high-energy 511 keV emission photons first. Once scaled, they can be applied to the emission data to obtain the attenuation corrected image. The CT transmission scan is acquired followed by the emission PET scan.

The inventors have invented a novel method of utilizing the background radiation that exist in lutetium-based scintillators in the PET scanners as the transmission source to collect the attenuation information, thus eliminating the need for conducting separate CT transmission scans or using a coupled modality performed in integrated PET/CT scans. This simplifies the image reconstruction process in PET scanners using lutetium-based scintillators.

Lutetium-based scintillators have intrinsic background radiation which originates from the isotope Lu-176 that is present in natural occurring lutetium. The decay that occurs in this isotope is a beta decay that is in coincidence with cascade gamma emissions with energies of 307 keV, 202 keV, and 88 keV. The coincidental nature of the beta decay with the cascade gamma emissions allow for separation of the emission data originating from a positron annihilation event from transmission type data from the Lu-176 beta decay. By using the time-of-flight information and the information of the chord length between two lutetium-based scintillator pixels in coincidence as a result of Lu-176's beta decay emission and the emitted cascade gamma emission, a second time window can be set to observe the lutetium-based scintillator's background radiation as transmission events simultaneously with the primary gamma emission from the positron annihilation events in the subject's body during a PET scan.

FIG. 1 is a flow chart 100 illustrating the method for using lutetium-based scintillator crystals' background beta decay emission in a PET scanner as a transmission scan source for generating attenuation maps is disclosed. The method comprises (a) calculating a time-of-flight for a would-be beta emission with the coincidental cascade gamma emission from a Lu-176 beta decay based on the distance between two opposing detectors in the PET scanner's detector ring. (See block 110). This step calculates what the time-of-flight should be for a beta emission with the coincidental cascade gamma emission from a Lu-176 beta decay in a given PET scanner based on the distance between two opposing detectors in the PET scanner's detector ring. In other words, the distance of interest here is the distance from the first detector, in which the beta emission occurs, to the second detector in which the coincidental cascade gamma is detected. Next, (b) a time window is defined, wherein the time window has a width centered around the calculated time-of-flight. (See block 120). Next, (c) time-of-flight of actual beta emissions originating from Lu-176 beta decay is measured in the lutetium-based scintillator crystals in the PET scanner with a scan object in the PET scanner's field of view. (See block 130). Next, (d) the measured time-of-flight from (c) are compared against the calculated time-of-flight and the measured time-of-flight that are within the time window are identified. (See block 140). Then, (e) the beta emissions events corresponding to those measured time-of-flight that are within the time window are identified as transmission source events originating from the Lu-176 beta decay, thereby discriminating the transmission type data from Lu-176 beta decay as a transmission source from emission events and random events (see block 150). The resulting transmission type data thus obtained can be used to generate attenuation maps for correcting the primary PET emission scan data.

The inventors have verified the method by implementing it on an example PET scanner, Siemens Biograph™ mCT scanner. This, however, required modifying the scan parameters for the Siemens Biograph™ mCT scanner because of the particular features of the Biograph™ mCT scanner. Mainly, the scan parameters of the scanner had to be modified to increase the coincidence window to result in a coincidence radius that is larger than the physical radius of the Siemens Biograph™ mCT scanner's detector ring. Multiple energy windows centered on 307 keV and 202 keV is then added to recognize the cascade gamma from Lu-176 decay.

A blank transmission scan data is acquired without any object in the PET scanner's field of view to provide a baseline transmission data. Subsequently, a PET emission scan is performed with the scan object in the field of view. During the scan, both the PET emission scan data and the discriminated transmission type data from Lu-176 beta decay are simultaneously acquired. The resulting transmission type data was then used to generate an attenuation map by reconstructing a transmission image from the transmission type data. PET emission scan data corrections are performed using the attenuation map, wherein the PET emission scan data corrections comprise at least one of attenuation correction and scatter correction.

The blank transmission scan refers to taking a transmission scan using the background radiation of Lu-176 with no object in the FOV. In order to avoid interfering with the measured PET scanning, the blank scan was conducted when the PET scanner was not being used and in an idle state. During the measured PET scanning, both the PET emission scan data and the discriminated transmission type scan data from Lu-176 beta decay were obtained. The blank transmission scan data and the measured transmission data of the object in the FOV were used to reconstruct a transmission image (i.e. a measured attenuation map). This reconstructed transmission image was then used to perform PET emission data corrections such as attenuation correction and scatter corrections. Inventors have observed that the flux of the background radiation activity is high enough to create good transmission images with an acquisition time of about 10 minutes.

Figure 3:
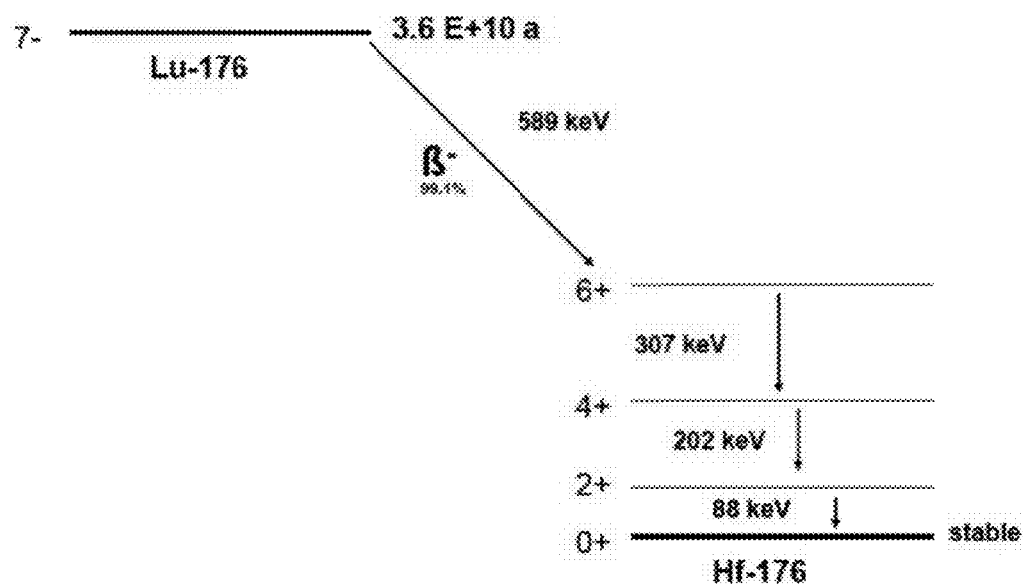
FIG. 3 shows the decay scheme of Lu-176.

Lutetium-based scintillators are known to have intrinsic radiation that originates from the isotope Lu-176, which is 2.6% abundant in natural occurring lutetium. Lu-176 decay through beta decay with coincidental cascading gammas having energies of 307, 202 and 88 keV. This is illustrated in FIG. 3. In standard clinical lutetium scintillator based PET scanners, this intrinsic radiation is observed as singles events where enough energy from a beta emission or a beta plus a cascade gamma emission is deposited into a single block detector and qualified above the lower level discriminator. In Siemens Biograph™ mCT block detector used as an example, these singles rate was on the order of 5000 counts per second per block. This gives a 4 ring mCT a randoms rate of ~1200 randoms per second.

In a standard Siemens Biograph™ mCT scanner, the coincidence signal from Lu-176 beta decay is not seen because the standard scan setting for the coincidence window on such mCT scanners is ~4 ns which equates to a spatial acceptance radius of ~30 cm. This prevents most of the longer lines of response (LOR) in the scanner from being considered. Because the spatial acceptance radius of ~30 cm is smaller than the physical radius of the scanner (in the case of Siemens Biograph™ mCT, the physical radius is 43 cm) the Lu-176 decay emission emanating from the detector blocks are not seen. The physical radius of a scanner refers to the radius defined by the distance between two opposing detectors in the detector ring. The LORs that are less than the 30 cm in length are further discriminated by the lower level discriminator (LLD), which is set to 435 keV.

Therefore, in order to detect the decay emission radiation from Lu-176, some modifications were made to the Siemens Biograph™ mCT scanner's scan setting, but no modifications to the hardware was necessary. The coincidence time window was increased to an appropriate value to result in the coincidence radius that is larger than the physical radius of the scanner. In the example Siemens Biograph™ mCT scanner, increasing the coincidence window to ~6.6 ns resulted in a coincidence radius of 49 cm compared to the physical radius of the scanner which is 43 cm. The LLD was lowered to ~160 keV. The constant fraction discriminators (CFD) thresholds are also lowered to a value of 160 keV.

In the processing firmware for the detectors in the Siemens Biograph™ mCT scanner, multiple energy windows were added to discriminate between the original emission 511 keV photons (gamma) from a positron annihilation event and the two gammas from Lu-176. These additional energy windows were centered on 307 keV and 202 keV to recognize the cascade gammas from Lu-176. The events within these energy windows were tagged in listmode data and were used in the rebinner for energy discrimination.

Figure 4:
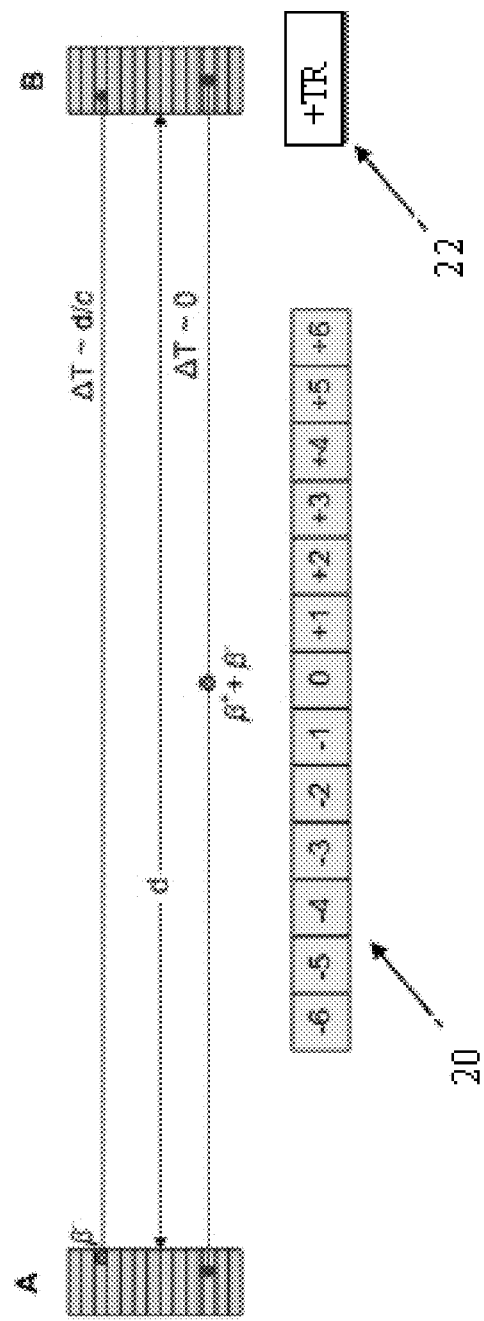
FIG. 4 a diagram showing the time bins 20 for the positron annihilation emission data and the new time bins 22 for the Lu-176 decay transmission data between two block detectors in 2 dimensions.

Then, the signal from Lu-176 was measured by recording the beta emanating from the originating detector as a source of a coincidence event, such as the origin of the decay so that the coincidences are directional based on the beta occurring first followed by the detection of the gamma at a later point in time. The signal from Lu-176 was then treated as a transmission type data. This beta ionizes its energy locally in the lutetium-based material and was accepted if it had enough energy to trigger the CFD. If one of the 307 keV or 202 keV gammas (the 88 keV gammas are ignored) escapes the originating detector, it traverses the FOV and be absorbed by an opposing detector and recorded as a coincidental event. The PET scanner then records the event's positions to create a LOR and records a time difference for the two events. By knowing the spatial positions of the two scintillator pixels that recorded the particular LOR, a look-up table can be created to relate the chord length of the measured LOR to the time of flight of the traversing gamma. The look up table is a table of distances between any two detector elements. Because a given PET scanner is a fixed geometry system, the look up table only has to be created once and is valid for all systems of the same geometry. Using this relation provided in the look-up table, a transmission coincidence time window was created for each LOR. FIG. 4 is a diagram showing the time bins 20 for the positron annihilation emission data and the new time bins 22 for the Lu-176 decay transmission type data between two block detectors in 2 dimensions. A event is the beta event and B is the gamma from a coincidental Lu-176 decay.

The events were further processed by knowing the energy of the gamma and using the information from the time-of-flight to get directionality of the LOR. Since the beta is emitted and captured locally in the LSO, the beta event happens first, therefore, in the detector element with the smaller time stamp of the two events. The beta only has to trigger the CFD whereas the gamma from Lu-176 decay must deposit enough energy to fall into one of the added energy window for the Lu-176 events.

The transmission data from Lu-176 decay obtained during the blank transmission scan were rebinned in the same manner as described above and also separated into 2 separate sinograms depending on the gamma's energy. Then, transmission images were reconstructed from this transmission data which was used as the attenuation maps for correcting the emission PET scan data. The transmission images were reconstructed with an ML-TR iterative algorithm with quadratic regularization that models the transmission data statistics.

Figure 5A:
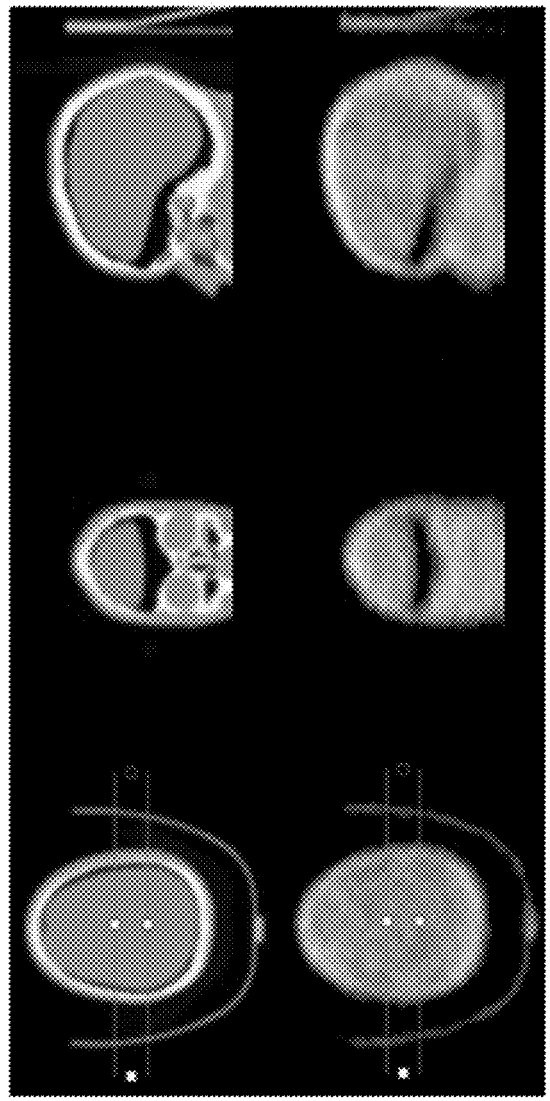
FIG. 5A shows CT attenuation map (the top row) and scaled attenuation map from Lu-176 transmission data (the bottom row) with 1 hour acquisition of a striatal brain phantom.
Figure 5B:
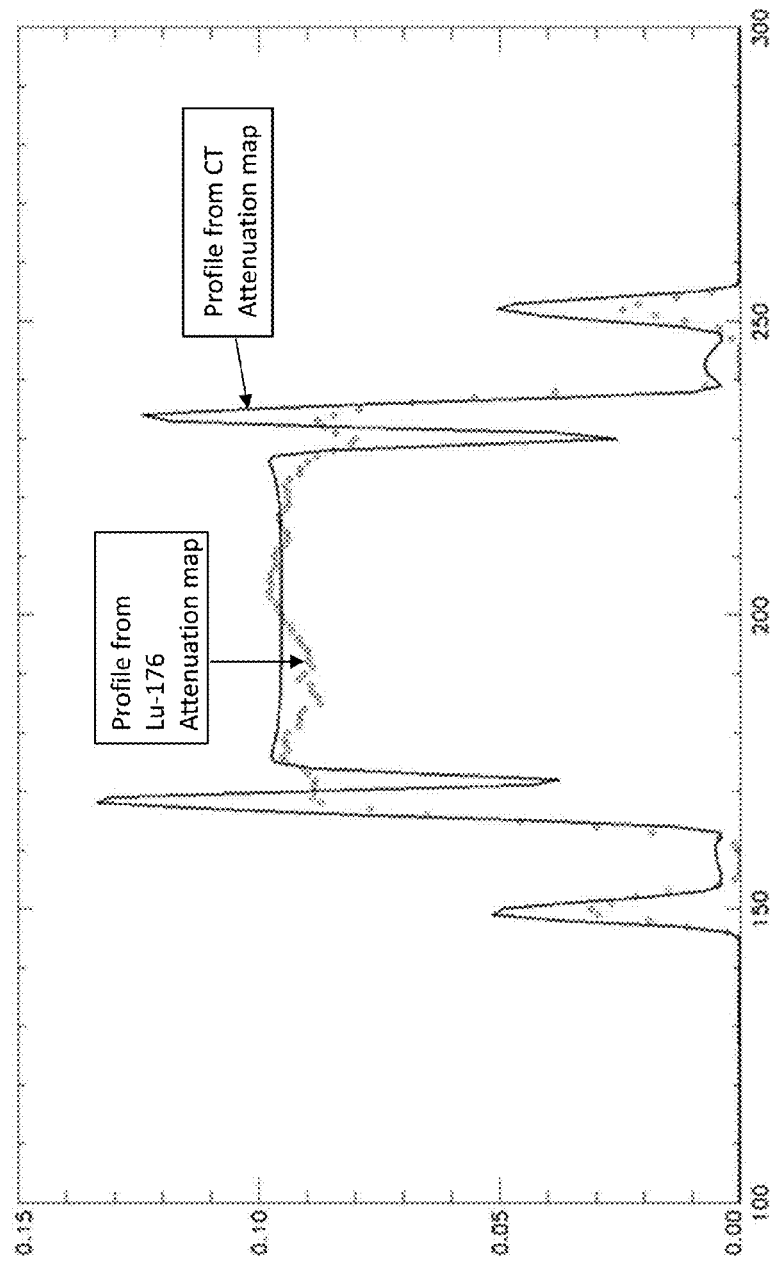
FIG. 5B shows a comparison of the profiles from both attenuation maps.

When using the attenuation maps from the Lu-176 transmission data for corrections to 511 keV emission data, scaling the raw attenuation map to 511 keV energies must be performed. For this work, when emission and transmission scan data were collected simultaneously, only the 307 keV transmission data was used. For this window, the attenuation values were scaled using the ratio of the total attenuation coefficients of water at the values of 511 keV and 307 keV, which is 0.096/0.117. The attenuation coefficients of water was used because the test phantom objects scanned were water-based or polymers that had very close attenuation characteristics of water. FIGS. 5A, 5B demonstrate that the scaling of the reconstructed attenuation map from the transmission data from Lu-176 is similar to that derived from a CT scan. FIG. 5A shows CT attenuation map (the top row) and scaled attenuation map from Lu-176 transmission data (the bottom row) with 1 hour acquisition of a striatal brain phantom. FIG. 5B shows a comparison of the profiles from both attenuation maps. There is a loss of fine structure detail using the transmission method. How this translates into PET emission data corrections is discussed below.

A. Rebinning of Emission and Transmission Data

A phantom study was performed to demonstrate the ability to separate the emission and transmission data. A uniform phantom with ~1 mCi of activity was placed on the bed next to a cold CT calibration phantom. FIGS. 6B-6D show the sinograms acquired simultaneously. FIG. 6A shows a photograph of the experimental setup with hot uniform phantom and cold CT calibration phantom. The corresponding sinograms are shown in FIGS. 6B-6D. FIG. 6C shows the emission sinogram from a 10 minute scan acquisition and clearly shows the emission events with the shadowing of the cold CT phantom. FIG. 6B shows the transmission sinogram of 202 keV gammas from the 10 minute scan acquisition and FIG. 6D shows the transmission sinogram of 307 keV gammas from the 10 minute scan acquisition. In both transmission sinograms, both phantoms in the field of view are visible as well as the bed that the phantoms are placed on. All sinograms in the figures are displayed with the same polarity of greyscale.

B. Contamination of Transmission Data from Emission Signal

Figure 7A:
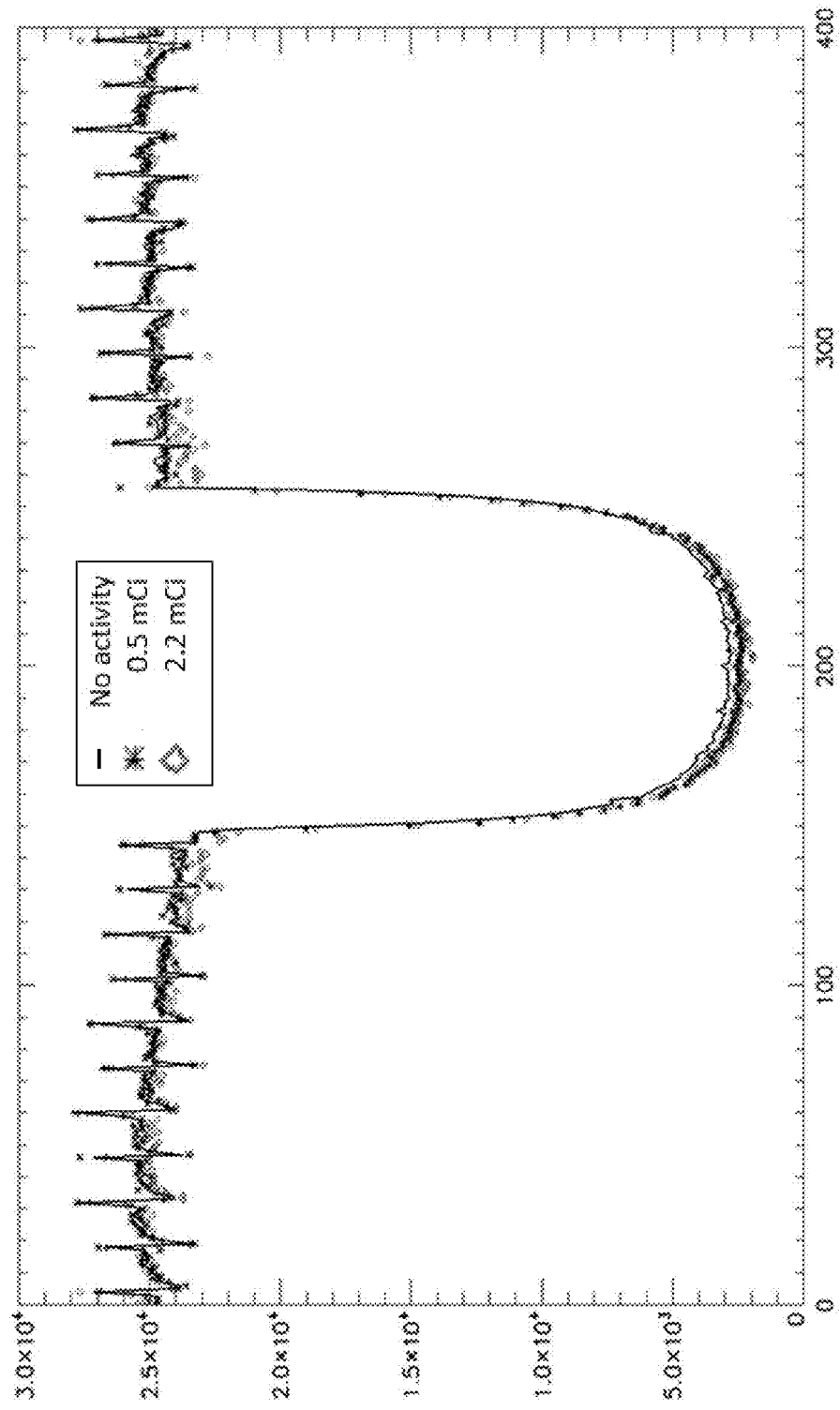
FIG. 7A shows a profile across all the sinogram elements with summing over 100 angles and summing of all axial planes for 202 keV transmission sinogram.
Figure 7B:
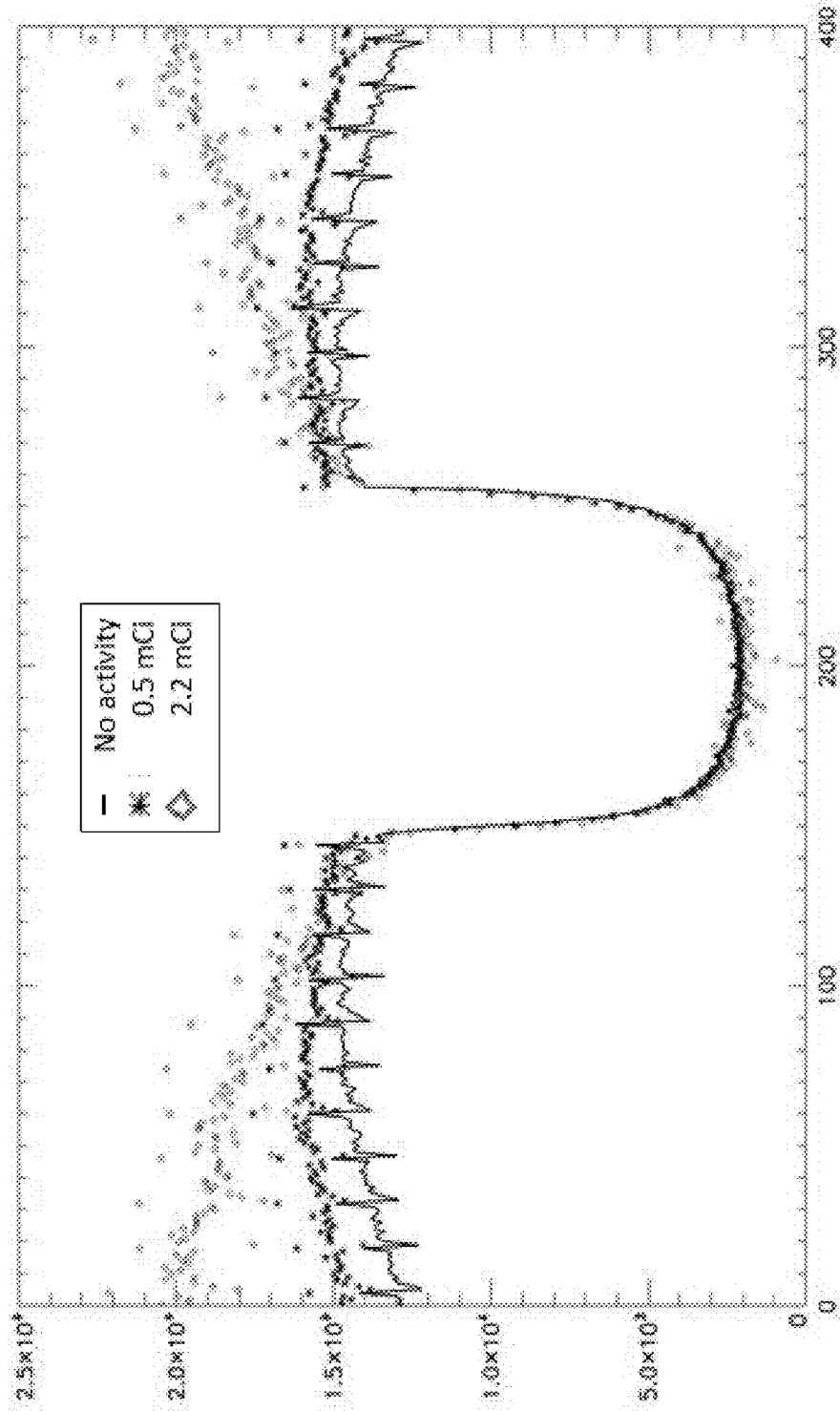
FIG. 7B shows a profile across all the sinogram elements with summing over 100 angles and summing of all axial planes for 307 keV transmission sinograms.

From FIGS. 6B and 6D, one can observe a noisier 202 keV sinogram when compared to the 307 keV sinogram. A study was performed to see whether the transmission data was contaminated by the emission data and to determine whether the contamination is a function of emission source activity. Three uniform phantoms with varying activity from no activity to 0.5 mCi and 2.2 mCi were placed in the geometric center of the PET field of view. These phantoms were measured for 1 hour and rebinned into the 2 transmission trues sinograms (prompts-delays). A profile across all the sinogram elements with summing over 100 angles and summing of all axial planes are shown in FIG. 7A for 202 keV and 7B for 307 keV transmission sinograms. No activity is shown with (a solid line "-"), 0.5 mCi is shown with a star symbol, and 2.2 mCi is shown with a diamond symbol.

When scanning hot phantoms, it has been observed that the reconstruction of 307 keV transmission data is generally not affected by emissions from the phantom itself. In contrast, artifacts have been observed for 202 keV transmission data. The contamination of 202 keV events can be attributed to the scattering of 511 keV emission photons that are indistinguishable from 202 keV transmission photons. In some embodiments, a scattering model can increase the amount of usable data in the presence of emission activity. The additional information provided by emission backscatter provides a limited scalable transmission flux based on the activity that illuminates scintillator crystals of PET detector blocks.

Figure 14A:
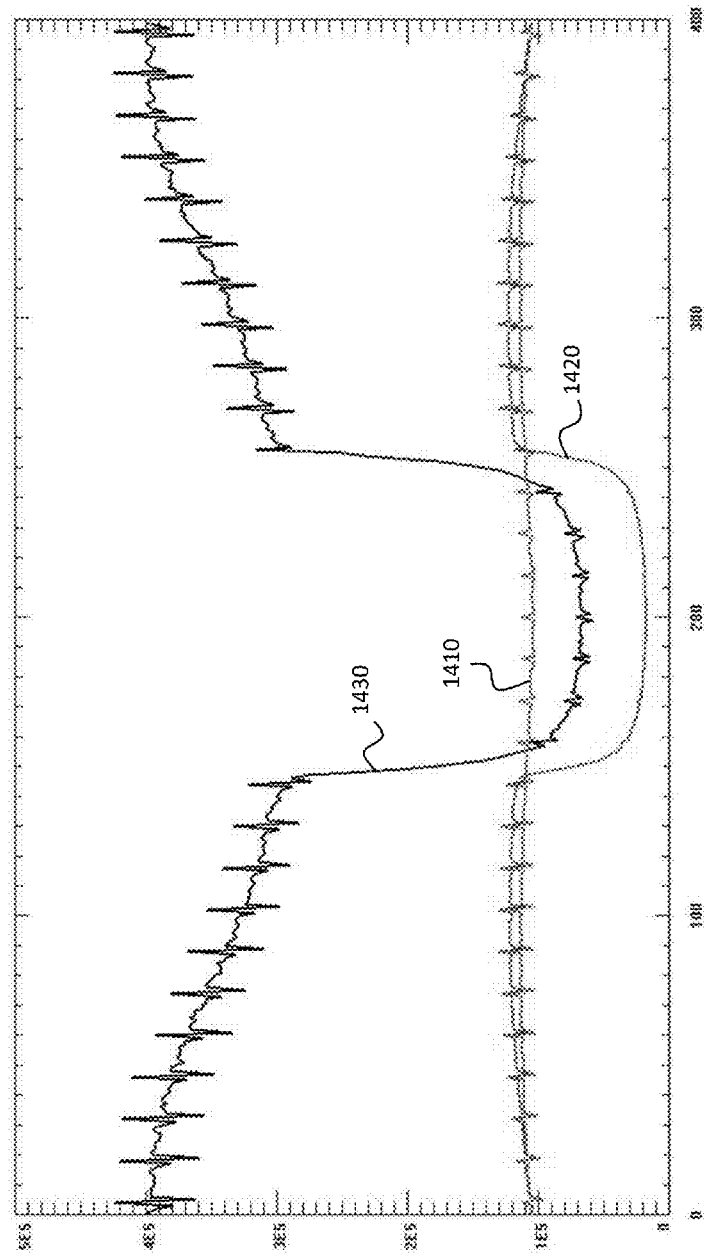
FIG. 14A shows intensity vs. sinogram bin plots for three scans.

FIG. 14A shows intensity vs. sinogram bin plots for three scans performed under the same scan times. FIG. 14A includes plot 1410 corresponding to a blank scan (no object in the field of view of the PET scanner), plot 1420 corresponding to a cold (no radioactivity) 20 cm phantom, and plot 1430 corresponding to a hot (2.2 mCi) 20 cm phantom with 511 keV radioactivity. The vertical axis in FIG. 14A corresponds to intensity (counts per bin) and the horizontal axis corresponds to sinogram bin. For plots 1420 and 1430, the phantom occupies generally the central sinogram bins. For the regions at the left and right of FIG. 14A (i.e., areas where the phantom is not present), the three plots should match or be close, but they are not. The mismatch of plot 1430 relative to plots 1410 and 1420 at the tails (left and right regions of FIG. 14A) shows additional flux of transmission type data. Such mismatch causes image reconstruction to be inaccurate and not useful for any corrections or use prior to attenuation-emission approximating algorithms.

Figure 14B:
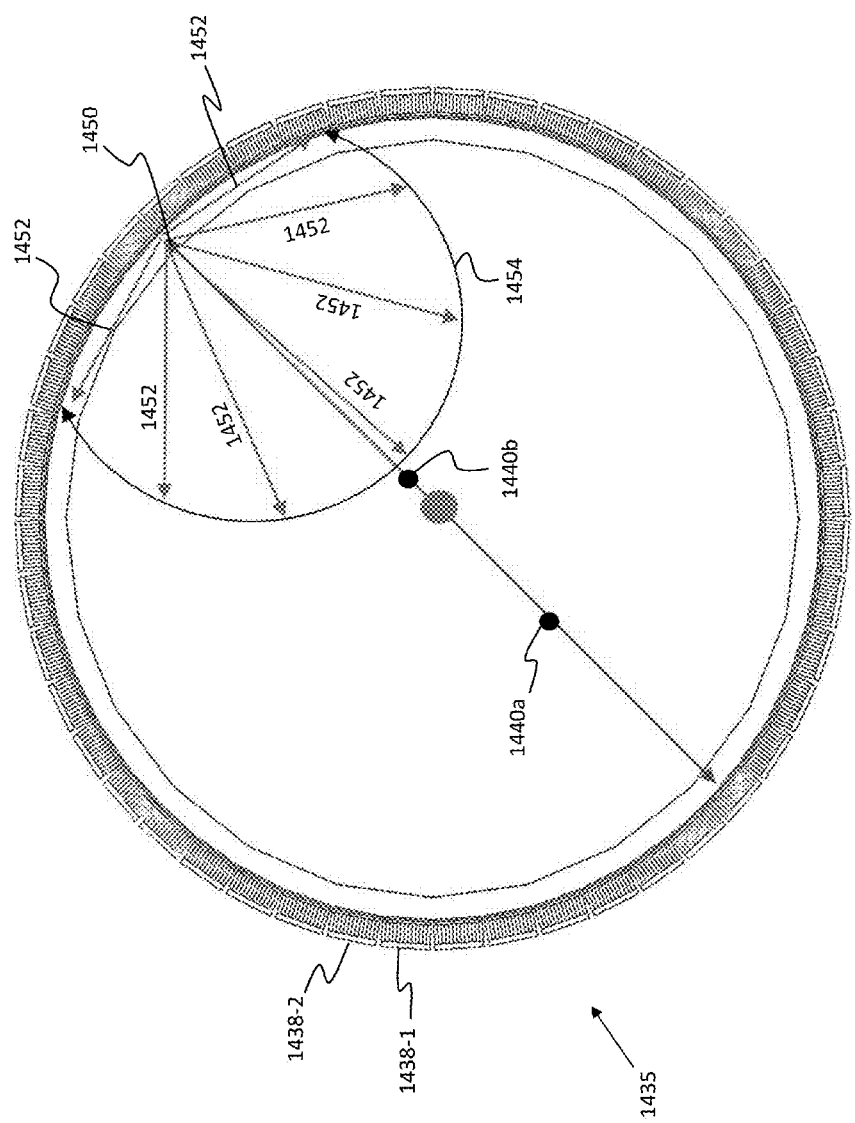
FIG. 14B is an illustration of photon scattering scenarios.

FIG. 14B shows a gantry 1435 and multiple detector blocks 1438-1, 1438-2, etc. placed around a gantry 1435. When an annihilation event occurs near the center of the gantry, two gamma photons travel in opposite directions along trajectories 1440a and 1440b, respectively. Scattering associated with one of the gamma photons (gamma photon 1440b) is shown in FIG. 14B. After impacting a detector block at scattering point 1450, gamma photon 1440b may scatter at any of various angles, as shown by arrows 1452. In addition to the arrows 1452 shown in FIG. 14B, the scattering may occur at any of various other scattering angles within arc 1454. A photon that scatters so as to reverse its course is said to backscatter at a scattering angle of 180 degrees, which is a relatively improbable occurrence. Other scattering scenarios are discussed below in the context of FIG. 17B. Scattering at angles of 90 degrees or greater may be referred to as backscattering.

Figure 14C:
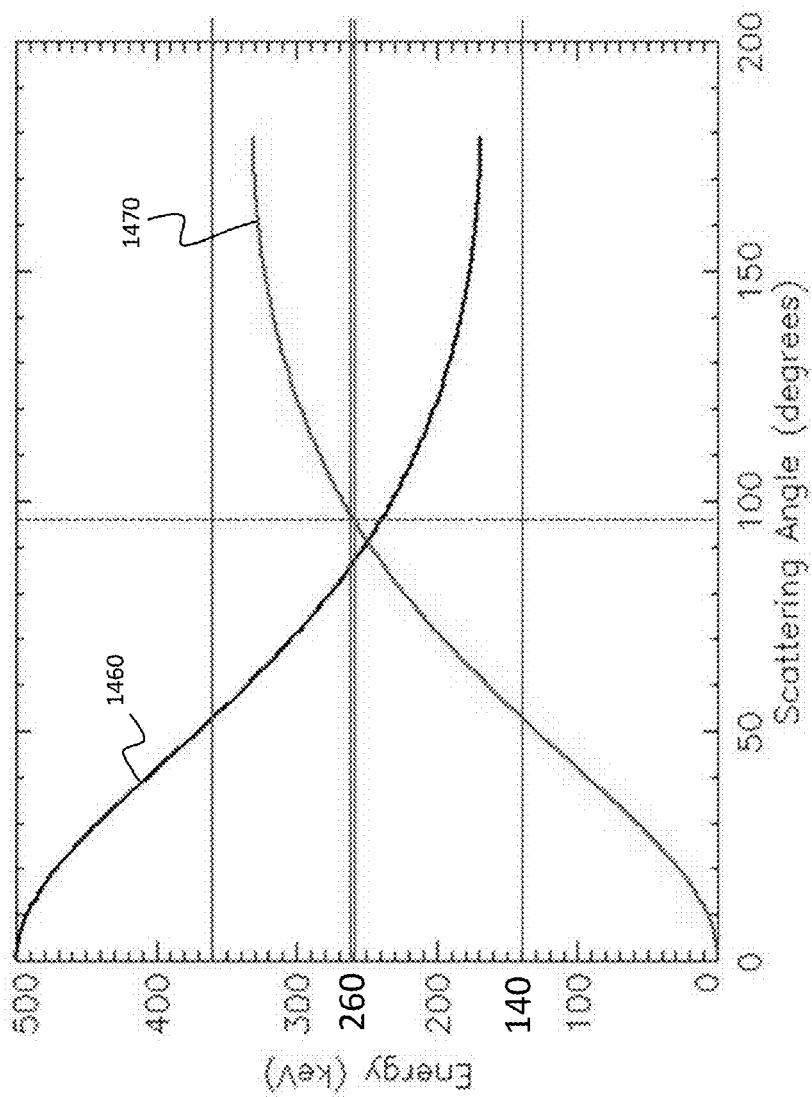
FIG. 14C is a plot of energy vs. scattering angle for a gamma photon and a Compton electron.

FIG. 14C shows the effect of scattering on 202 keV transmission type events. Plot 1460 corresponds to a scattered gamma photon, and plot 1470 corresponds to a recoil Compton electron that deposits energy in a scintillator crystal. In some embodiments, the energies accepted for 202 keV transmission events are between 140 and 260 keV. Scattering at about 90 degrees or greater causes a scattered photon to be within the 202 keV energy window. Thus, FIGS. 14B and 14C demonstrate that a wide range of scattering angles can result in a 202 keV transmission type event.

Figure 15:
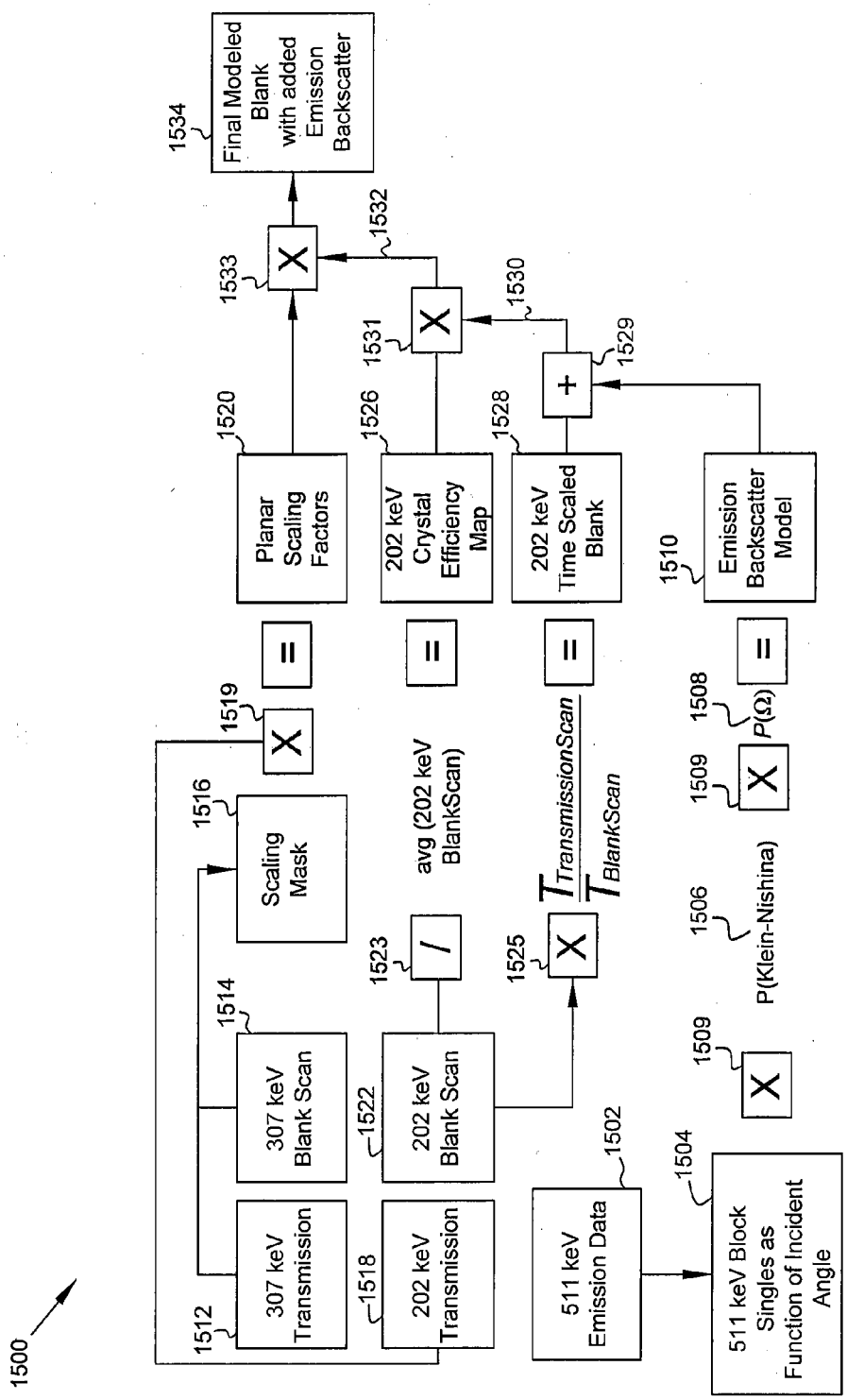
FIG. 15 is a flowchart illustrating a process in accordance with some embodiments.

FIG. 15 is a flowchart illustrating a process 1500 in accordance with some embodiments. At box 1502, 511 keV emission data is acquired at detector blocks of the PET scanner. The emission data corresponds to 511 keV gamma photons originating from annihilation events associated with radioactivity of a hot phantom in the field of view of the PET scanner. The emission data may be separated from transmission data using the discrimination techniques described above. Based on the emission data, a histogram of counts is generated for 511 keV gamma photons detected at respective detector blocks over a range of incident angles.

Figure 16A:
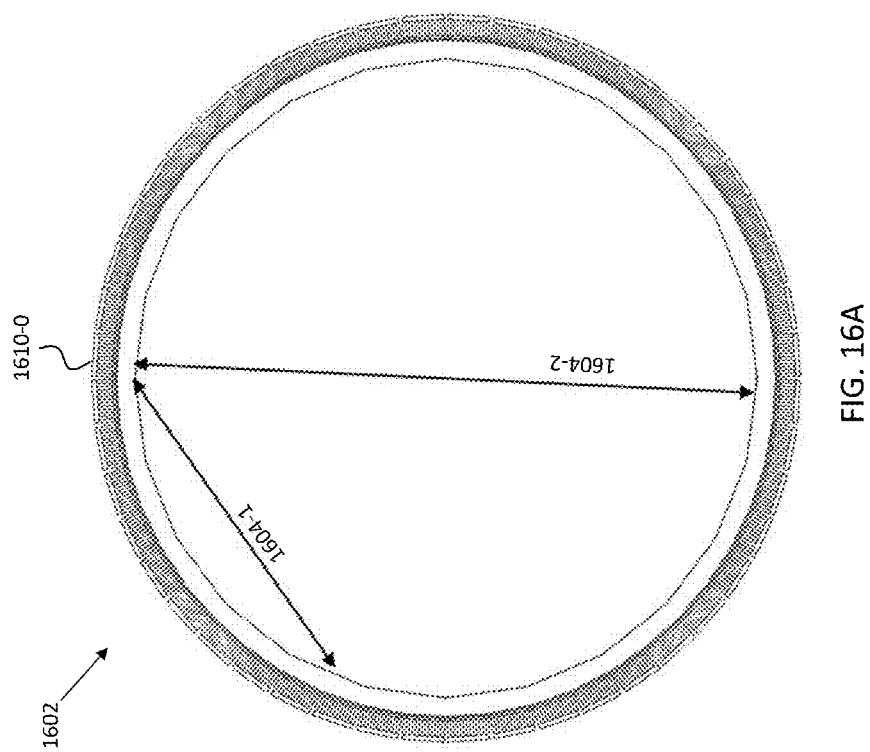
FIG. 16A shows incoming block singles at a detector block of a PET scanner.
Figure 16B:
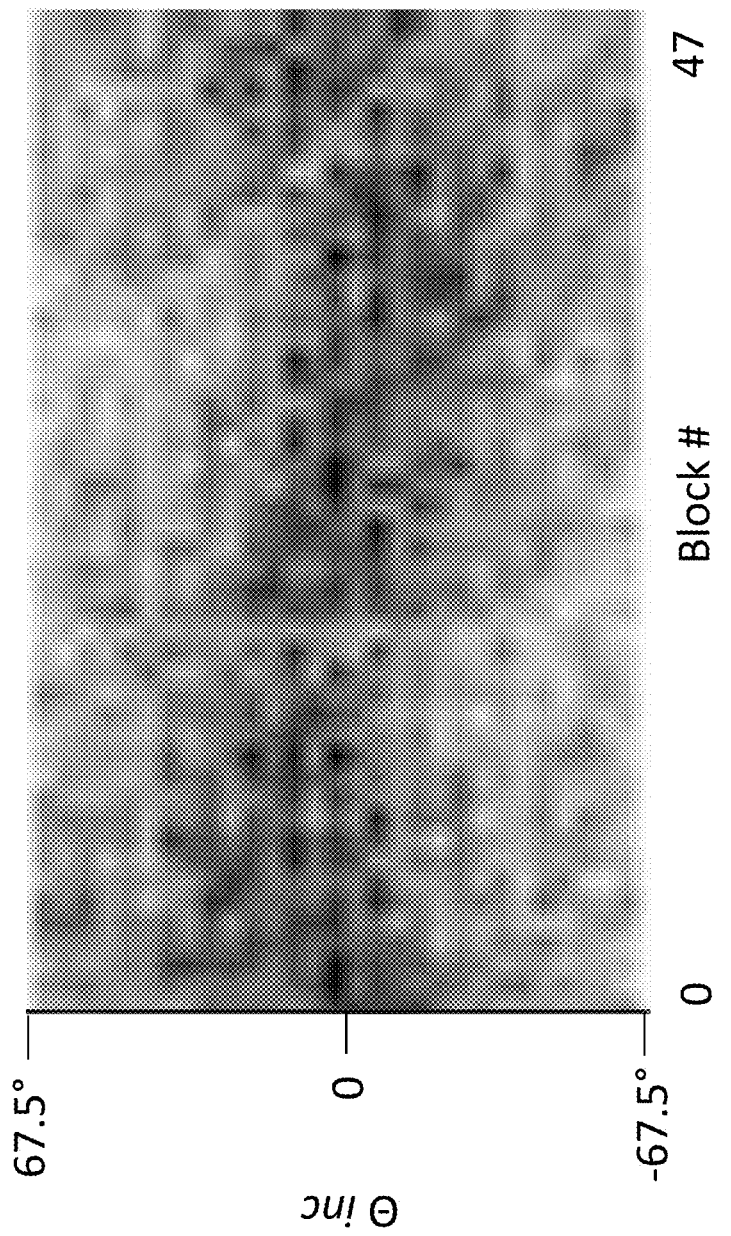
FIG. 16B is a histogram of 511 keV counts in accordance with some embodiments.

The physical basis for this histogram is understood with respect to FIG. 16A, which shows incoming 511 keV block singles that impact block 1610-0 positioned as shown with respect to gantry 1602. Photon trajectories 1604-1, 1604-2, and 1604-3 correspond to various incident angles, with trajectory 1604-2 being an incident angle of zero degrees. The flux, i.e., number of counts detected at a block in a given time duration, is histogrammed to yield a histogram, e.g., as in FIG. 16B. In the 511 keV flux histogram of FIG. 16B, the horizontal axis is block index, e.g., ranging from 0 to 47 in some embodiments, with block index 0 corresponding to detector block 1610-0 in FIG. 16A. The vertical axis in FIG. 16B is incident angle $\theta_{inc}$. The value at each cell of the histogram is represented by grayscale intensity. In the example of FIG. 16B, $\theta_{inc}$ is shown ranging from −67.5 degrees to 67.5 degrees, with the midpoint along the vertical axis corresponding to an incident angle of 0 degrees.

Thus, at box 1504, a histogram of counts is computed for 511 keV gamma photons detected at respective detector blocks over a range of incident angles.

Figure 17B:
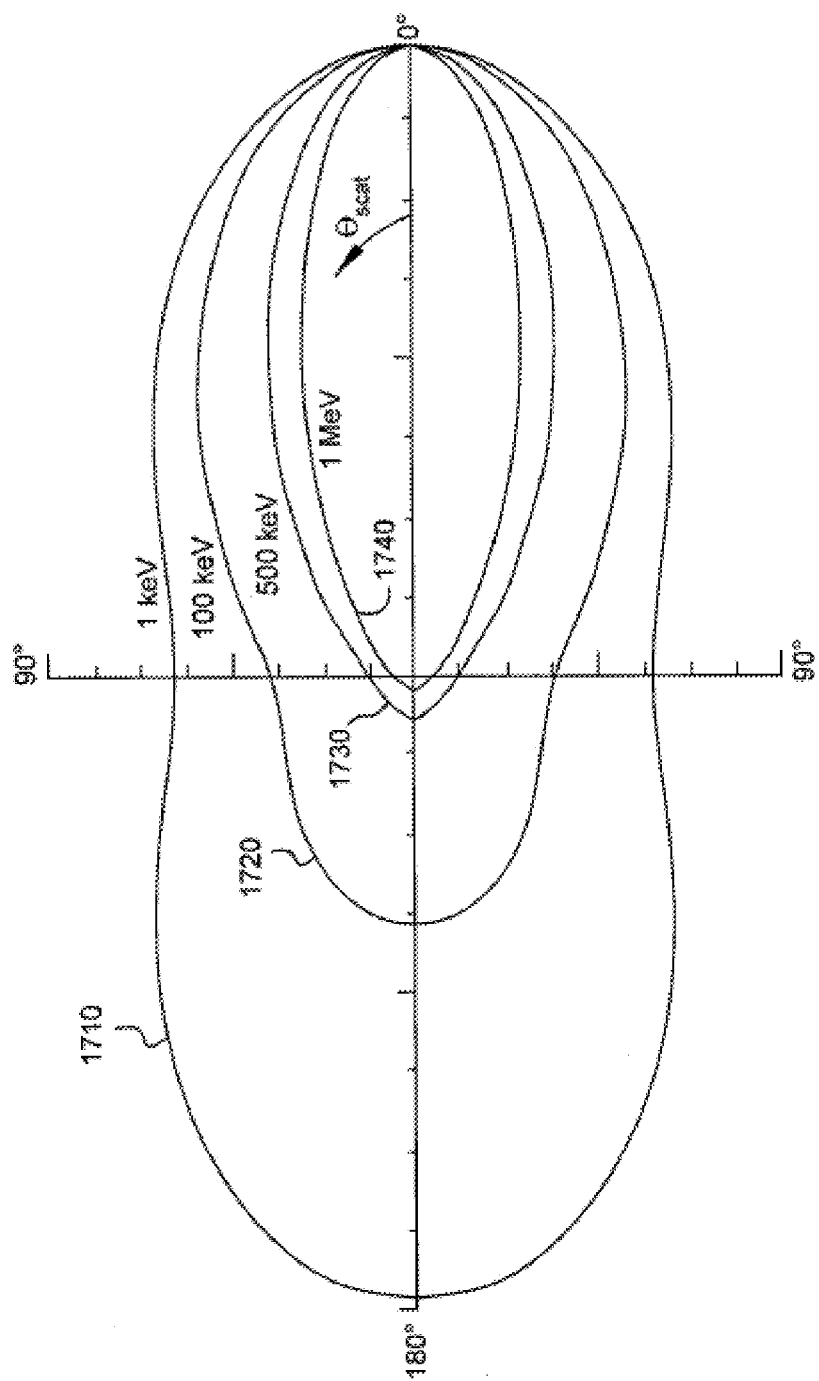
FIG. 17B is a set of polar plots showing, for various energies, relative probabilities of scattering at various scattering angles in accordance with some embodiments.

At box 1506 in FIG. 15, a probability of scatter for 511 keV gamma photons is computed as a function of scattering angle for each pair of detector blocks of the scanner, to obtain a set of scatter probabilities. FIG. 17A is an illustration of a scattering scenario for a scattering angle $\theta_{scat}$. For a given energy, the probability of photon scattering can be computed as a function of scattering angle $\theta_{scat}$ by using the Klein-Nishina formula, which is described at, e.g., Klein, O and Nishina, Y, "Über die Streuung von Strahlung durch freie Elektronen nach der neuen relativistischen Quantendynamik von Dirac," Z. Phys. 52 (11-12): 853-68 (1929). Referring to FIG. 17B, polar plots 1710, 1720, 1730, 1740 are shown for various energies (1 keV, 100 keV, 500 keV, and 1 MeV, respectively). For a given energy, the probability of scattering at scattering angle $\theta_{scat}$ is proportional to the magnitude of a vector extending from the origin to a point on the corresponding polar plot, with the angle of the vector being $\theta_{scat}$. Based on the magnitudes of such vectors for all possible angles and by normalizing to yield a value between 0 and 1, probability of scatter may be determined as a function of scattering angle. For example, it is observed from FIG. 17B that for 1 MeV photons, the probability of backscattering at 180 degrees is the least probable scattering scenario, and scattering at 0 degrees (i.e., no deviation in the trajectory after scattering) is the most probable scattering scenario.

Using the Klein-Nishina formula for 511 keV photons, for each pair of detector blocks of the PET scanner, the probability of a photon scattering at a first detector block in the pair and then traveling along a linear trajectory to a second detector block in the pair (i.e., a scatter probability) can be calculated and stored in a memory of the PET scanner, e.g., in a lookup table indexed by the detector blocks. This calculation is possible because of the fixed scanner geometry. With the fixed scanner geometry, there is a one-to-one mapping between each pair of detector blocks and the scattering angle $\theta_{scat}$ described above for the Klein-Nishina formula.

Figure 18:
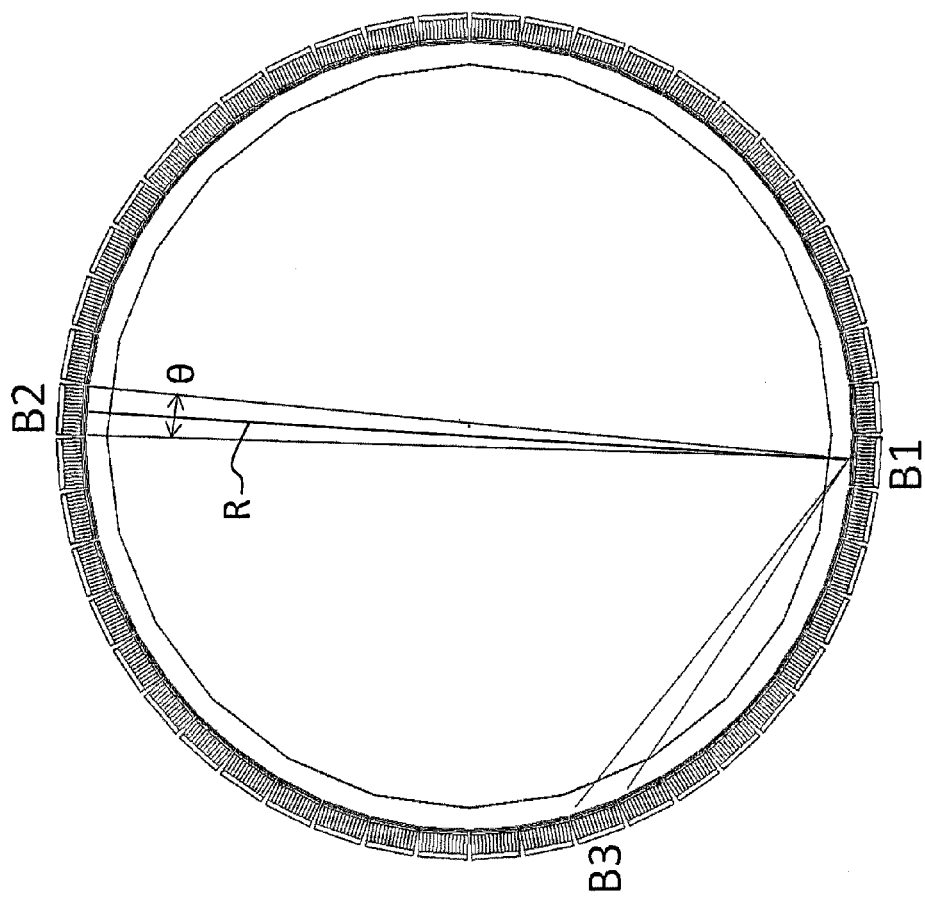
FIG. 18 is an illustration of a scanner geometry related to computing a solid angle of a detector block in accordance with some embodiments.

For a given scattering angle corresponding to scattering off a first detector block, the probability of impacting a second detector block is computed (box 1508 in FIG. 15). This computation is based on the three-dimensional nature of the PET scanner geometry. Referring to FIG. 18, suppose a gamma photon scatters off of detector block B1 in the direction toward detector block B2. The probability of the scattered photon impacting detector block B2 may be determined by calculating the solid angle of detector block B2 from a point of view of detector block B1. From the point of view of detector block B1, each other detector block appears essentially rectangular with a width w and height h, with w and h given by R*sin θ and R*sin φ, respectively, where R is the distance between B1 and B2 and θ and φ are spherical angles in three-dimensional space. The apparent size of B2 from the perspective of B1 can be determined by computing the solid angle for the B1-B2 pair, i.e., the area of B2 on a sphere with radius R. The probability of impacting detector block B2 after scattering from detector block B1 may be computed by comparing the solid angle for the B1-B2 pair with the solid angle for pairings between B1 and other detector blocks (e.g., detector block B3 shown in FIG. 18). The detector block impact probabilities may be stored in a memory of the PET scanner, e.g., in a lookup table indexed by the detector blocks.

Figure 19:
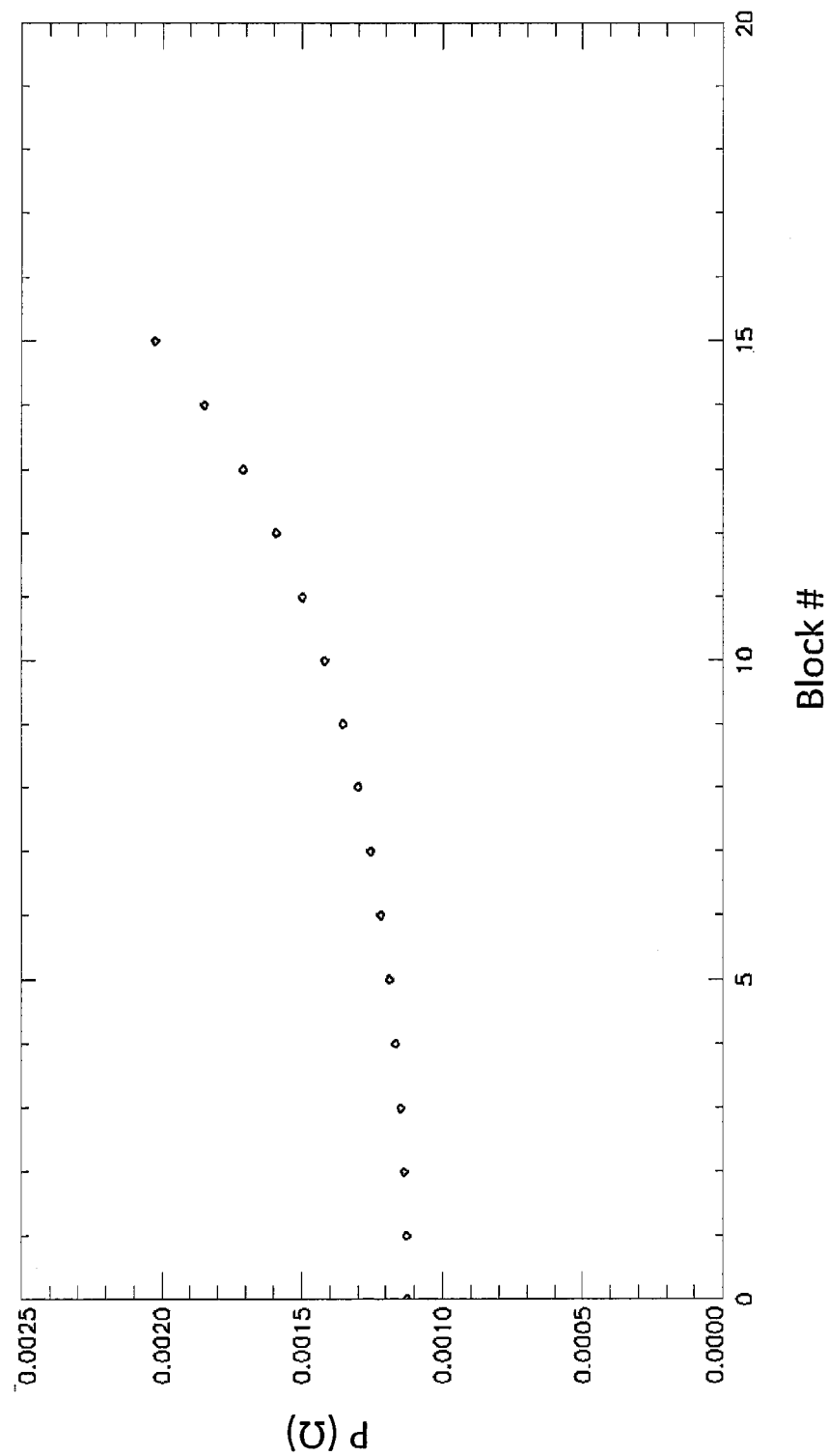
FIG. 19 is a plot of example detector block impact probabilities in accordance with some embodiments.

FIG. 19 is a plot of example detector block impact probabilities with reference to scattering off of detector block B1. Detector block impact probability may be labeled P(Ω) for convenience because Ω is traditionally the symbol used for solid angles. The horizontal axis of FIG. 19 depicts detector block index, with detector block index 0 corresponding to detector block B2 in FIG. 18 because it is opposite detector block B1. In some embodiments, the maximum detector block index for which the block impact probability is computed is 16, which corresponds to detector block B3 in FIG. 18. Such a maximum detector block index may be implemented because of an acceptance limit for a scanner's coincidence processing capability.

Figure 20:
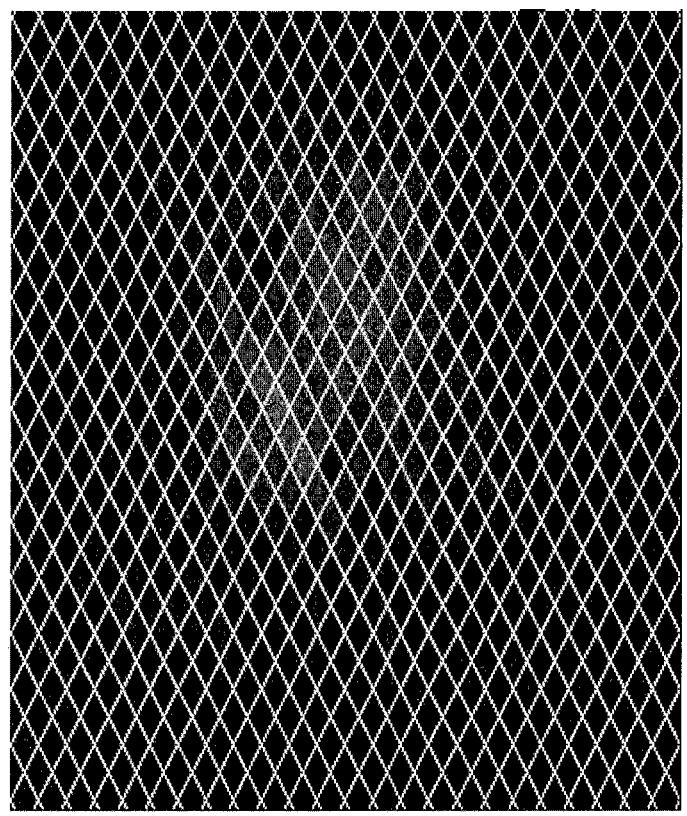
FIG. 20 is a sinogram for an emission block-pair scattering model in accordance with some embodiments.

Referring back to FIG. 15, at box 1510 the computed histogram of counts is scaled by the scatter probabilities and the block impact probabilities (boxes 1509), to generate an emission block-pair scattering model. One of ordinary skill recognizes that the scaling operations 1509 may be performed in either order. This scattering model is referred to as an emission block-pair scattering model because it is based on emission data and because it takes into account the geometry between a detector block at which scattering occurs and a detector block impacted by a scattered photon. An example emission block-pair scattering model is shown in FIG. 20, where the horizontal axis corresponds to sinogram bin and the vertical axis corresponds to angle.

The emission block-pair scattering model 1510 may be further processed as shown in FIG. 15.

Figure 21:
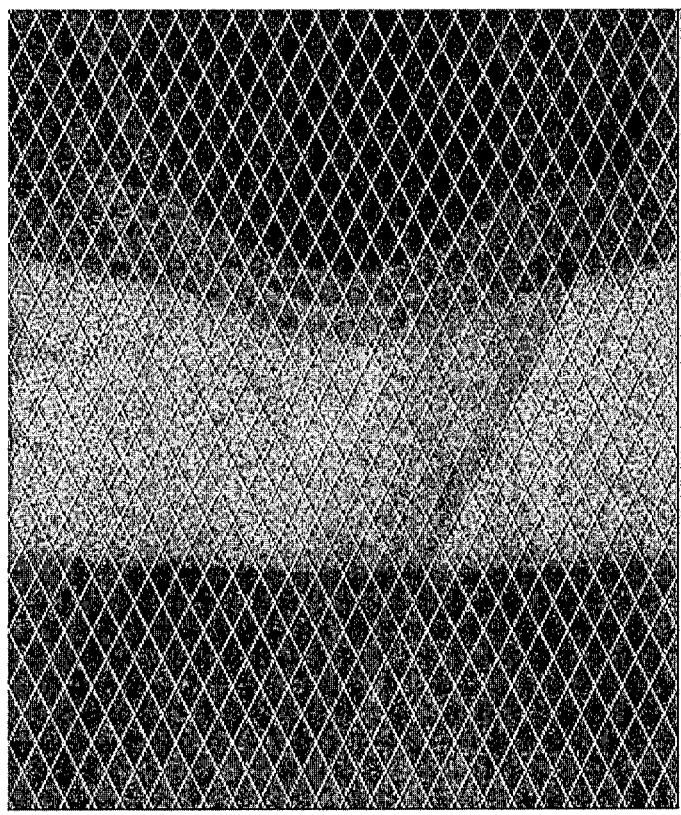
FIG. 21 is a sinogram for 307 keV transmission data in accordance with some embodiments.
Figure 22:
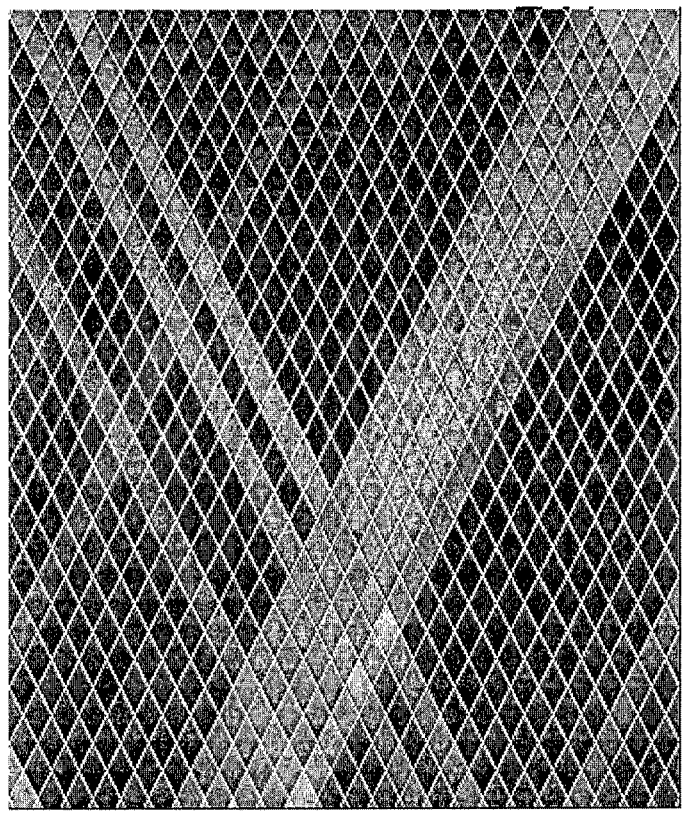
FIG. 22 is a sinogram for 307 keV blank scan data in accordance with some embodiments.
Figure 23:
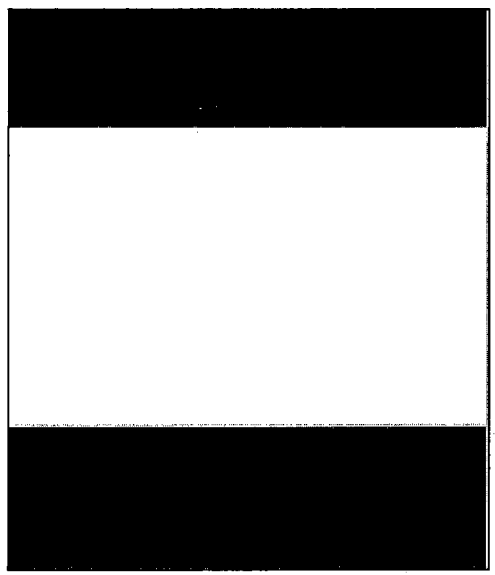
FIG. 23 is an example scaling mask in accordance with some embodiments.

At box 1512, transmission data of 307 keV gamma photons are acquired. The 307 keV gamma photons originate from intrinsic background radiation of a plurality of scintillator crystals in detector blocks of the PET scanner, when a radioactive phantom is in the field of view of the PET scanner. An example visualization of 307 keV transmission data is shown in FIG. 21, which is a sinogram with the horizontal axis corresponding to sinogram bin and with the vertical axis corresponding to angle. At box 1514, counts of 307 keV gamma photons originating from intrinsic background radiation of the scintillator crystals are acquired without any phantom in the field of view, to provide 307 keV blank scan data. An example visualization of 307 keV blank scan data is shown in FIG. 22, which has similar axes as FIG. 21. At box 1516, the 307 keV transmission data and 307 keV blank scan data are automatically compared to generate a scaling mask. For example, at locations (bin-angle pairs in the sinogram) where the phantom is present, the mask may be set to 0, and at locations where the phantom is absent the mask may be set to 1. An example scaling mask is shown in FIG. 23, in which values of 0 and 1 are shown with white and black, respectively. The determination regarding presence or absence of the phantom may be performed by noting that the 307 keV transmission data and 307 keV blank scan data are the same or substantially similar (i.e., within a predetermined tolerance of one another) where the phantom is absent.

Figure 24:
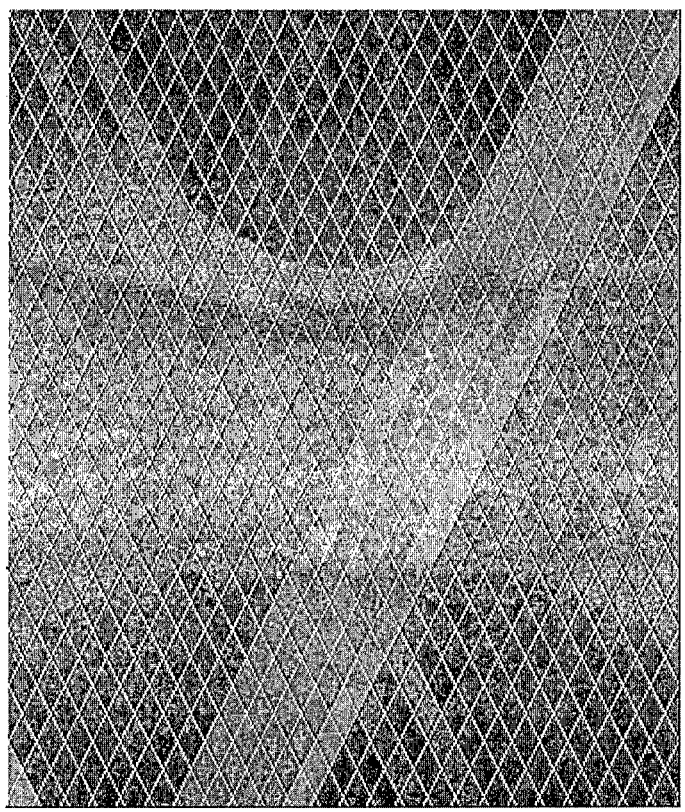
FIG. 24 is a sinogram for 202 keV transmission data in accordance with some embodiments.
Figure 28:
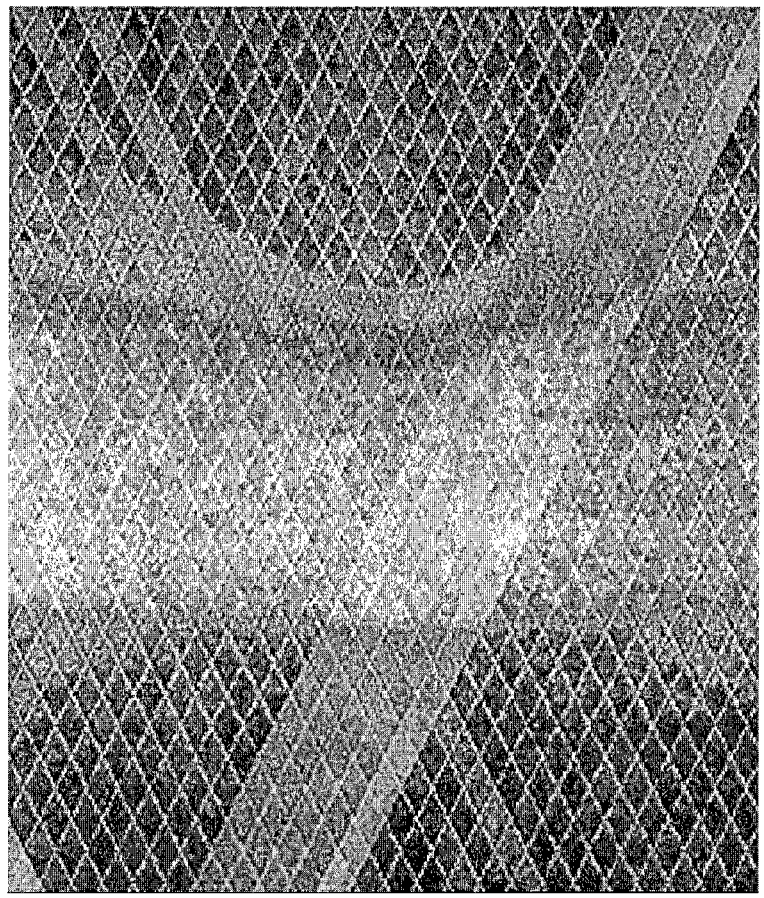
FIG. 28 is a sinogram for planar scaling factors in accordance with some embodiments.

At box 1518, transmission data of 202 keV gamma photons originating from intrinsic background radiation of the scintillator crystals are acquired, when the radioactive phantom is in the field of view of the PET scanner. An example visualization of 202 keV transmission data is shown in FIG. 24, which has similar axes as FIG. 21. The 202 keV transmission data, which is contaminated by scattering of 511 keV emission photons, is scaled (box 1519) by the scaling mask, which was formed based on relatively uncontaminated 307 keV transmission data. The result of the scaling is a set of planar scaling factors 1520. Example planar scaling factors are shown in FIG. 28, which has similar axes as FIG. 21.

Figure 25:
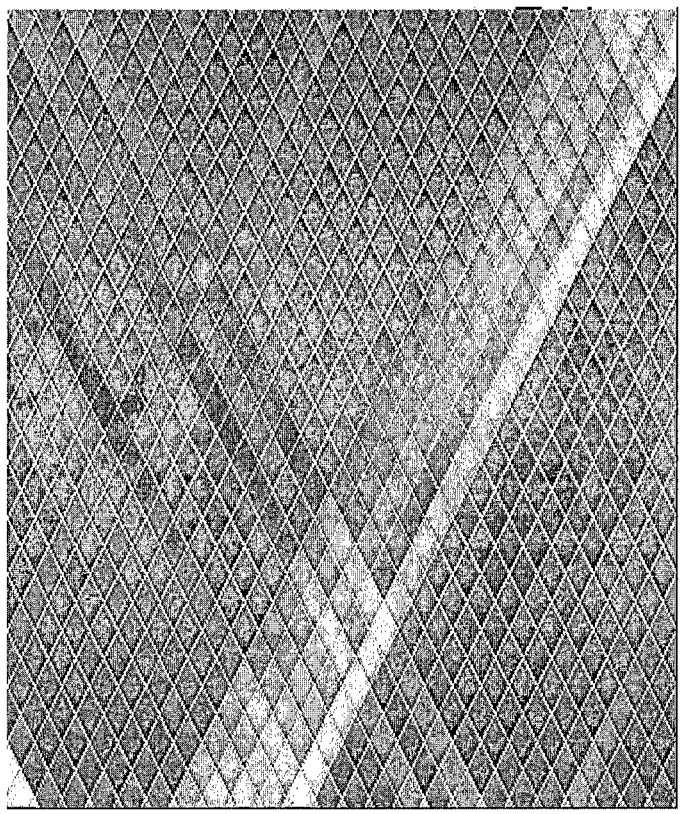
FIG. 25 is a sinogram for 202 keV blank scan data in accordance with some embodiments.
Figure 26:
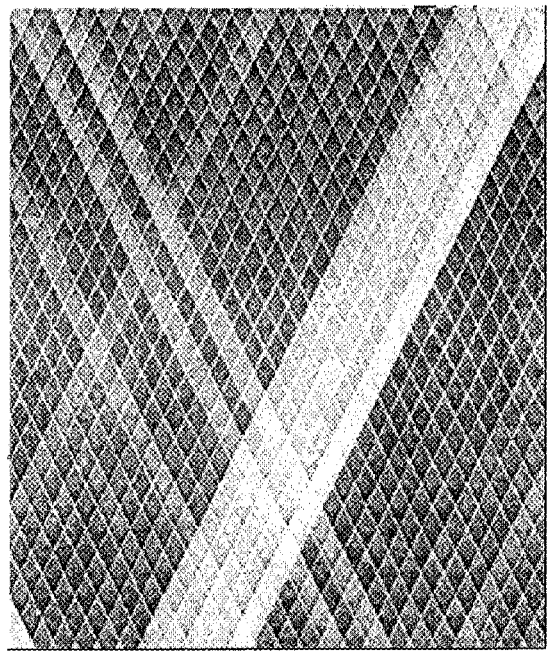
FIG. 26 is a sinogram for a 202 keV crystal efficiency map in accordance with some embodiments.
Figure 27:
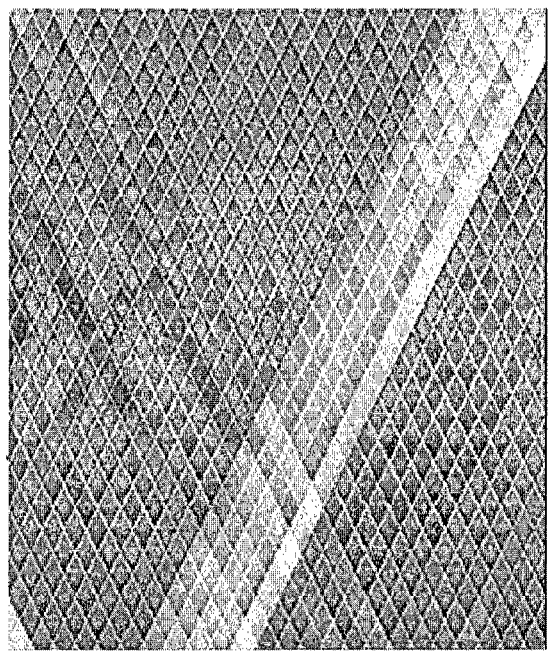
FIG. 27 is a sinogram for a 202 keV time scaled blank in accordance with some embodiments.

At box 1522, counts of 202 keV gamma photons originating from intrinsic background radiation of the scintillator crystals are acquired, without any phantom in the field of view, to provide 202 keV blank scan data. An example visualization of 202 keV blank scan data is shown in FIG. 25, which has similar axes as FIG. 21. A mean value of the 202 keV blank scan data sinogram may be computed and may be used to normalize the 202 keV blank scan data as shown at box 1523, to generate a 202 keV crystal efficiency map 1526. An example visualization of the 202 keV crystal efficiency map 1526 is shown in FIG. 26, which has similar axes as FIG. 21. The 202 keV blank scan data may also be scaled (box 1525) by a time scaling factor to yield a 202 keV time scaled blank 1528. An example visualization of the 202 keV time scaled blank 1528 is shown in FIG. 27, which has similar axes as FIG. 21. In some embodiments, the time scaling factor is $T_{transmission\_scan}/T_{blank\_scan}$, i.e., the ratio of the time for acquiring transmission data (e.g., about 360 sec) to the time for acquiring the blank scan data (e.g., about 3600 sec).

Figure 29:
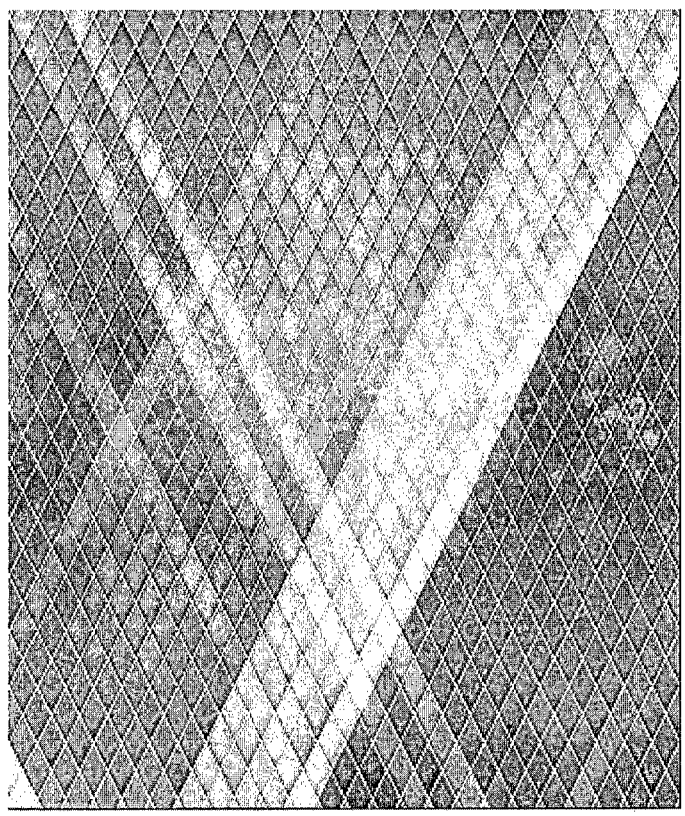
FIG. 29 is a sinogram for a final modeled blank in accordance with some embodiments.

At box 1529, the 202 keV time scaled blank 1528 is added to the emission block-pair scattering model 1510 to yield data 1530, which may be referred to as a composite model. The composite model 1530 may be scaled to compensate for 511 keV gamma photons scattering and being detected in a 202 keV energy window. For example, composite model 1530 may be scaled at box 1531 by the 202 keV crystal efficiency map 1526 to yield data 1532 and scaled at box 1533 by the planar scaling factors 1520 to yield a final modeled blank 1534 that accounts for emission block-pair scattering. One of ordinary skill in the art recognizes that the order of such scaling operations may be reversed. An example visualization of the final modeled blank 1534 is shown in FIG. 29, which has similar axes as FIG. 21.

Figure 30:
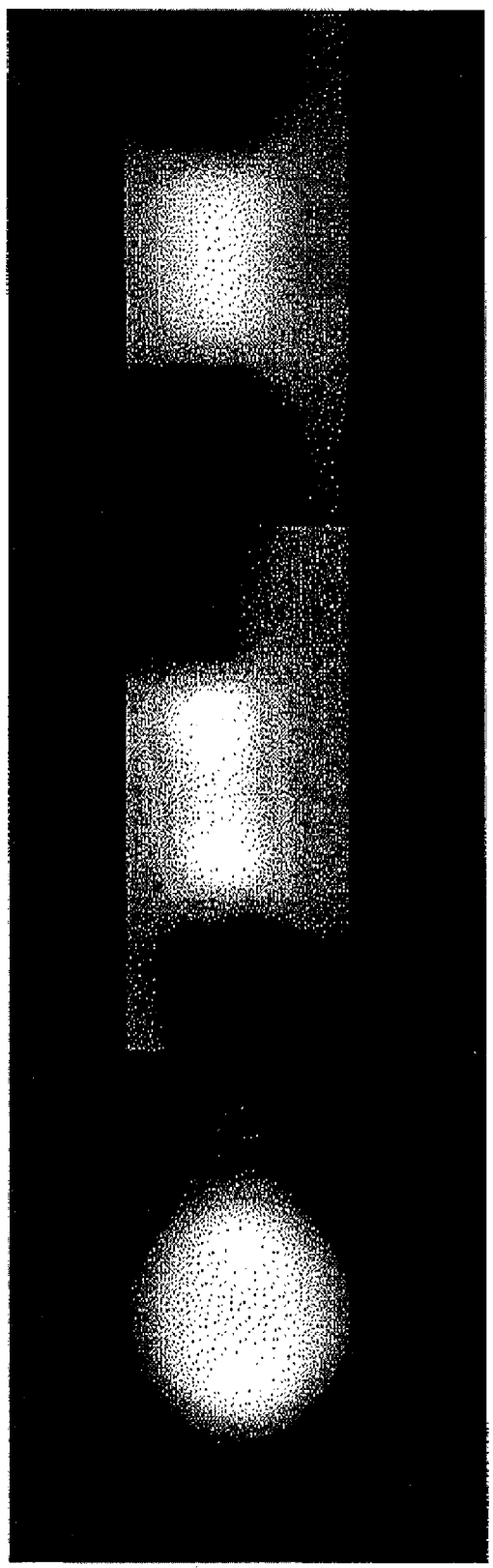
FIG. 30 is a set of reconstructed PET images using traditional techniques.
Figure 31:
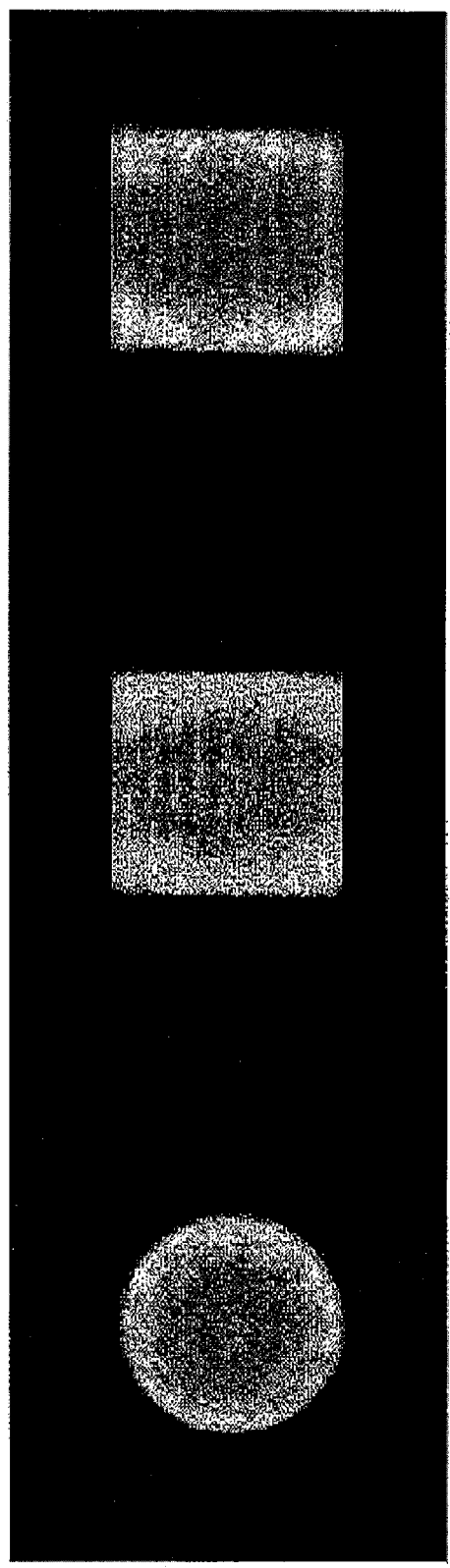
FIG. 31 is a set of reconstructed PET images in accordance with some embodiments.

The final modeled blank 1534 may be used to reconstruct PET images. FIG. 31 shows reconstructed images of a cylinder using final modeled blank 1534. Images reconstructed in accordance with various embodiments have fewer artifacts and better defined boundaries than reconstructed images formed using traditional techniques (FIG. 30). For FIGS. 30 and 31, the reconstruction algorithm parameters used were 10 iterations with 24 subsets with some regularization.

Although aspects of FIG. 15 are described above in a particular order for ease of explanation, the steps may be performed in other orders.

Another approach for handling contamination of 202 keV transmission data based on scattering of 511 keV emission photons is to discriminate and discard all 202 keV transmission data. In contrast to that approach, embodiments of the present disclosure model the scattering of emission photons and thereby enable all measured data to be used. By modeling scattering of emission photons, various embodiments increase transmission image quality and increasing the efficiency of transmission scans proportionally to the amount of emission activity in the scanner.

Figure 32:
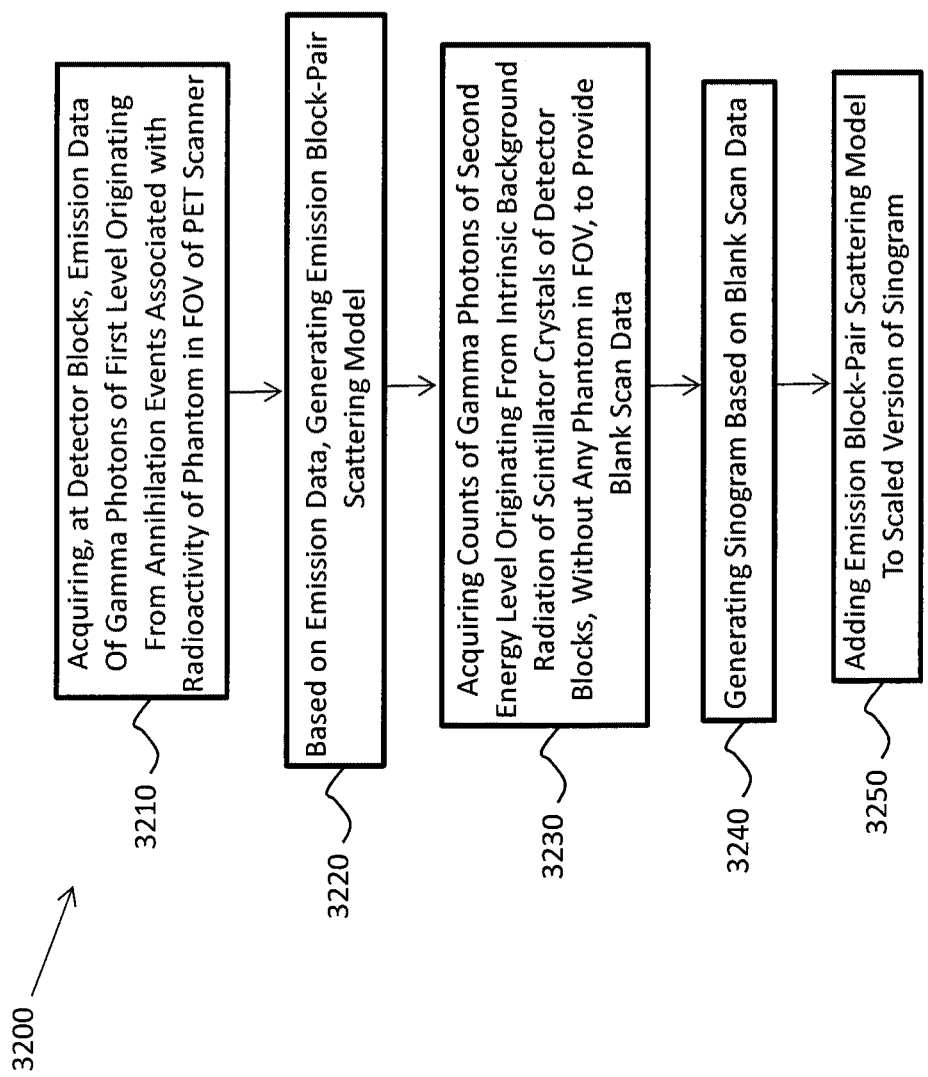
FIG. 32 is a flow diagram in accordance with some embodiments.

FIG. 32 is a flow diagram in accordance with some embodiments. A process 3200 for operating a PET scanner includes acquiring (box 3210), at a plurality of detector blocks of the PET scanner, emission data of gamma photons of a first energy level originating from annihilation events associated with radioactivity of a phantom in a field of view of the PET scanner. Based on the emission data, an emission block-pair scattering model is generated at box 3220. Process 3200 includes acquiring, at box 3230, counts of gamma photons of a second energy level originating from intrinsic background radiation of scintillator crystals of the detector blocks, without any phantom in the field of view, to provide blank scan data for the second energy level. At box 3240, a sinogram is generated based on the blank scan data for the second energy level. At box 3250, the emission block-pair scattering model is added to a scaled version of the sinogram to yield a composite model.

Figure 33:
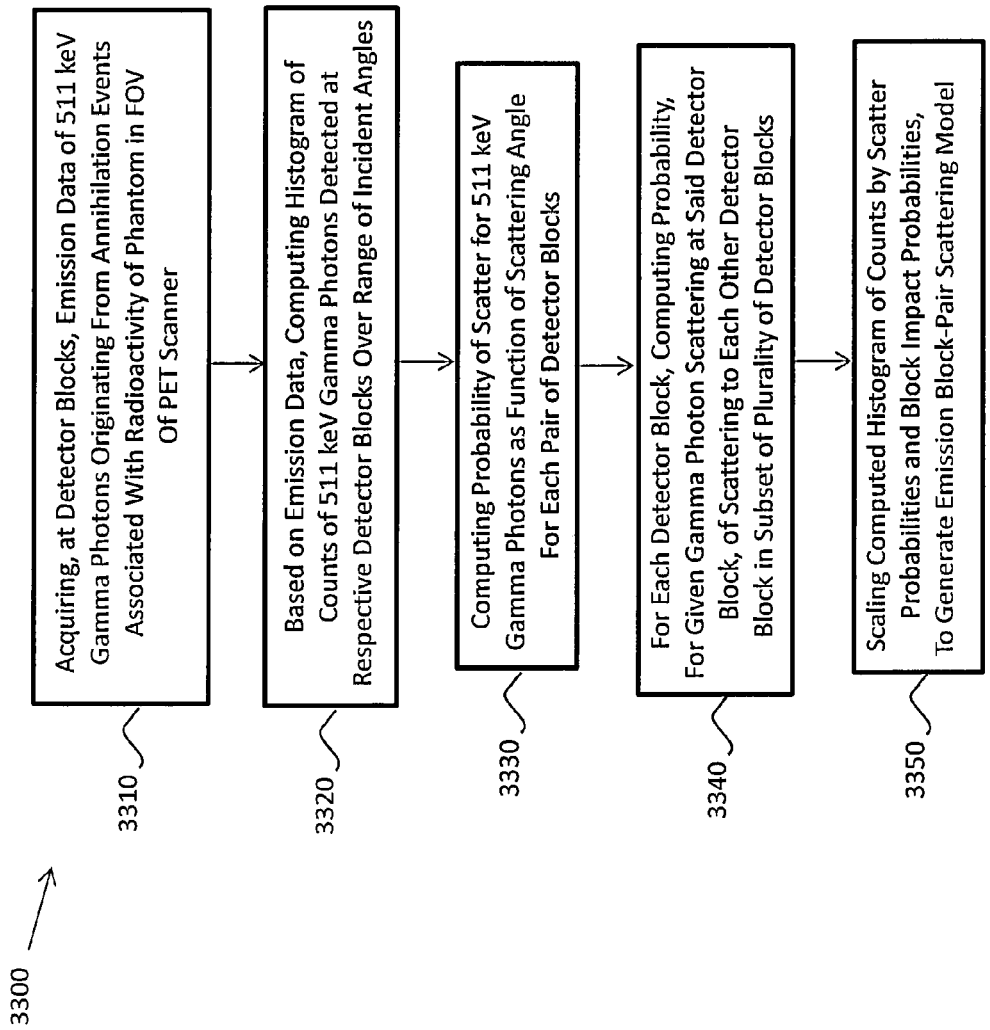
FIG. 33 is a flow diagram in accordance with some embodiments.

FIG. 33 is a flow diagram in accordance with some embodiments. A process 3300 for operating a PET scanner includes acquiring (box 3310), at a plurality of detector blocks of the PET scanner, emission data of 511 keV gamma photons originating from annihilation events associated with radioactivity of a phantom in a field of view of the PET scanner. Based on the emission data, a histogram of counts of 511 keV gamma photons detected at respective detector blocks over a range of incident angles is computed at box 3320. At box 3330, a probability of scatter is computed for 511 keV gamma photons as a function of scattering angle for each pair of detector blocks of the scanner, to obtain a set of scatter probabilities. At box 3340, for a given gamma photon scattering at each detector block, a probability of scattering to each other detector block in a subset of the plurality of detector blocks is computed, to provide detector block impact probabilities. At box 3350, the computed histogram of counts is scaled by the scatter probabilities and the block impact probabilities, to generate an emission block-pair scattering model.

C. Reconstructions of Cold Human Volunteers

A study of human subjects was performed in order to observe the quality of the images obtainable using techniques in accordance with various embodiments. The scan duration times were set to 10 minutes to simulate fairly realistic scan times and minimize movement from the study's volunteers. Each volunteer was placed on the PET scanner bed and inserted into the PET FOV with no activity in or around the PET scanner. A corresponding blank scan was acquired for 36 hours and used for reconstructions of the attenuation maps. The reconstruction algorithm parameters used were 10 iterations with 24 subsets with some regularization for all human volunteer studies. No corrections were performed to the data that corrects for object originating physical effects to the transmission gamma such as scatter or attenuation.

Figure 8:
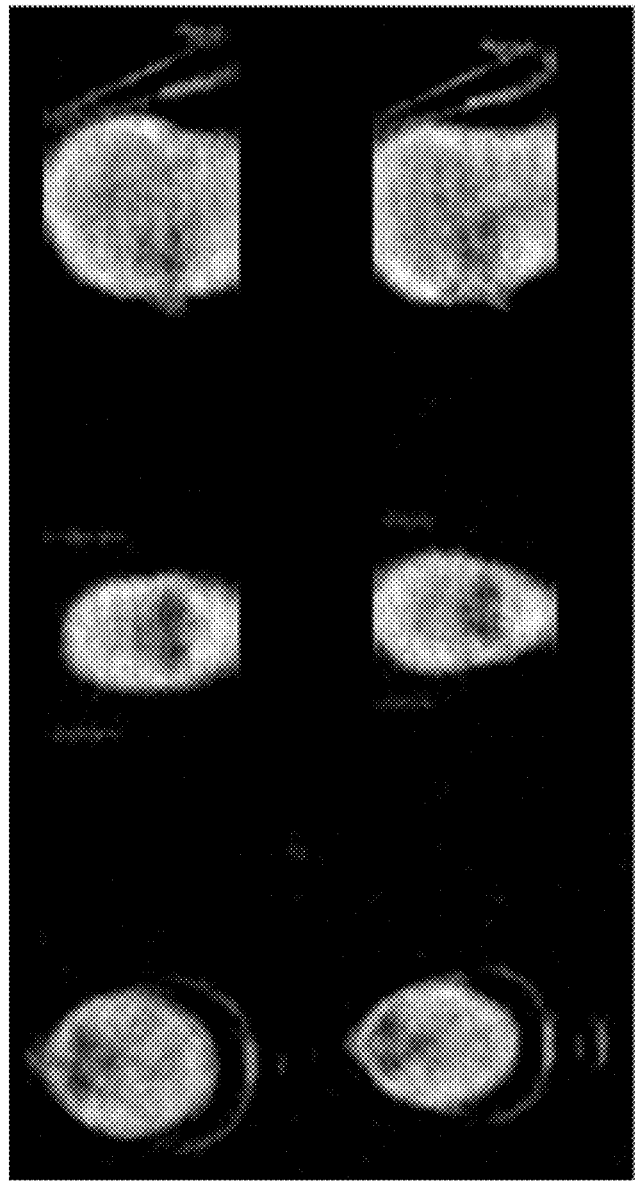
FIG. 8 shows reconstructed transmission images of two human volunteers' heads with a carbon fiber head holder in the FOV.

FIG. 8 shows reconstructed transmission images of two volunteers' heads with a carbon fiber head holder in the FOV. From the figure the sinus are visible and the head holder and outline of the head are well defined. Some high density regions are also visible such as parts of the skull and teeth.

Figure 9:
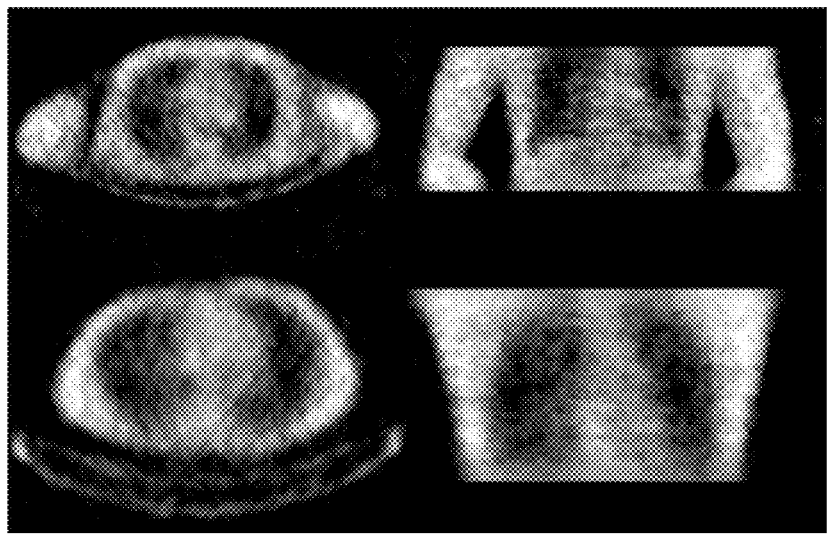
FIG. 9 shows reconstructed transmission images of a human volunteer's torso.

FIG. 9 shows reconstructed transmission images of a volunteer's torso. The volunteer was a male with weights of ~70 kg. The study of the torso region was performed with both arms up (bottom images) and arms down (top images) in a relaxed position. Arms are usually up in a clinical scan and sometimes suffer from truncation of the CT. Using transmission data from Lu-176, the FOV for the attenuation maps are matched to the PET FOV. From both studies, body outline is clearly resolved and internal details such as lungs and the heart are visible. The two studies also differ as the arms down case had the volunteer laying directly on the carbon fiber bed and the arms up case had the volunteer laying on a foam mat between the body and the bed. The bed is easily seen in both images but only having the whole bed visible when the volunteer is lying on a foam mat that separates the body from the bed. The patient's arms up on the foam mat is the typical clinical procedure for imaging in the torso region.

Figure 10:
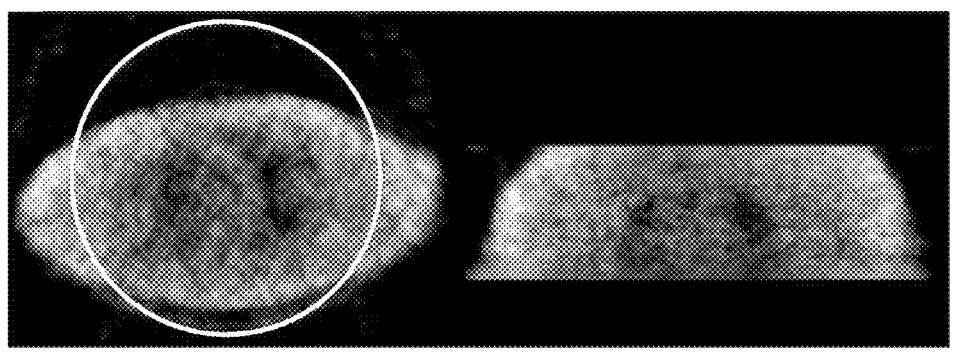
FIG. 10 shows reconstructed transmission image of a larger human volunteer of weight of ~180 kg that would experience truncation within the CT FOV.

FIG. 10 shows a larger human volunteer of weight of ~180 kg who would experience truncation within the CT FOV. The circle illustrates the CT FOV. This study was performed with arms down and 10 minutes. The red circle illustrates the CT 50 cm FOV and shows even if this study was performed with arms extended overhead, truncation would still occur to this volunteer. It is observed that the body contour is still resolved and some internal structures are visible such as the lungs and heart, but not as clear as the smaller volunteers' case.

D. Reconstruction of Emission Data with Lu-176 Attenuation Maps

Figures 11A, 11B:
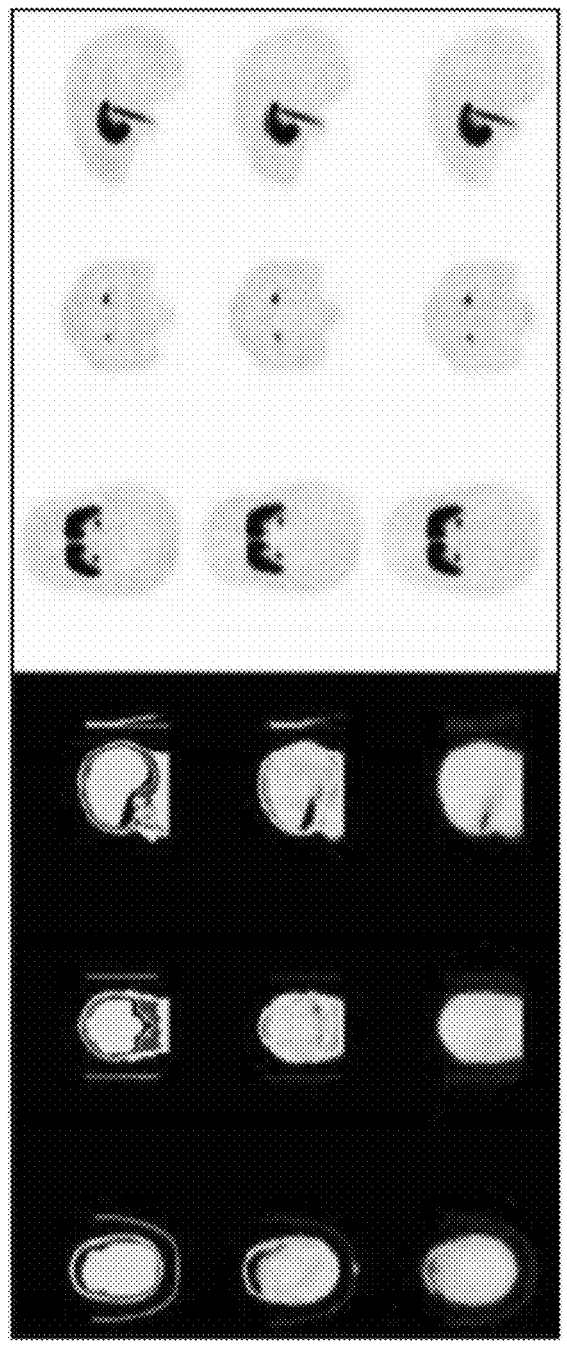
FIG. 11A shows attenuation maps derived from CT (top left), 1 hour of Lu-176 transmission data (middle left) and 10 minutes of Lu-176 transmission data (bottom left).
FIG. 11B shows the PET emission reconstruction of 10 minutes of emission data from 4 mCi of F-18.

Work was performed to show the PET reconstructed images where the attenuation maps from the simultaneous transmission scan were used for the corrections to the PET emission data. The first case was a striatal head phantom with a fillable water cavity for addition of activity to the phantom. The phantom was filled with 4 mCi of F-18 and placed in a carbon fiber head holder. The phantom was scanned using a standard head-neck protocol for duration of 10 minutes. A corresponding CT was performed before the PET scan was acquired. The PET scan was the same for all three cases where the emission data was rebinned for 10 minutes into time of flight sinograms. FIGS. 11A-11B show three cases of interest, CT corrected, 1 hour Lu-176 transmission, and 10 minutes of Lu-176 transmission data. The images in FIG. 11A show attenuation maps derived from CT (top left), 1 hour of Lu-176 transmission data (middle left) and 10 minutes of Lu-176 transmission data (bottom left). The images in FIG. 11B show the PET emission reconstruction of 10 minutes of emission data from 4 mCi of F-18 (image position correspond with attenuation maps used during corrections and reconstruction). The attenuation correction and scatter corrections were performed using the associated attenuation map and the PET emission reconstruction performed was OPOSEM with time of flight using 2 iterations and 24 subsets.

The PET emission data shows little difference between all three cases. Uniformity in all three cases also shows little differences demonstrating that the attenuation maps for these cases are good enough to perform the corrections to the emission data.

An image quality phantom was scanned to extend the study to a torso sized object. The phantom was filled with Ge-68 in an epoxy matrix and had an activity approximately 2 mCi at the time of the measurement. The phantom has 6 spheres with 4 hot (4× activity concentration from background) and 2 cold spheres with a cold cylinder in the center of the phantom. The phantom was placed in the centered to the bore and set on top of the bed in a foam holder for this particular phantom. A CT was performed before the phantom was moved into the PET FOV. The listmode acquisition was performed for 30 minutes. The emission data was rebinned for 10 minute acquisition time and all 30 minutes of transmission data for the 307 keV photons were rebinned for transmission data.

Figure 12:
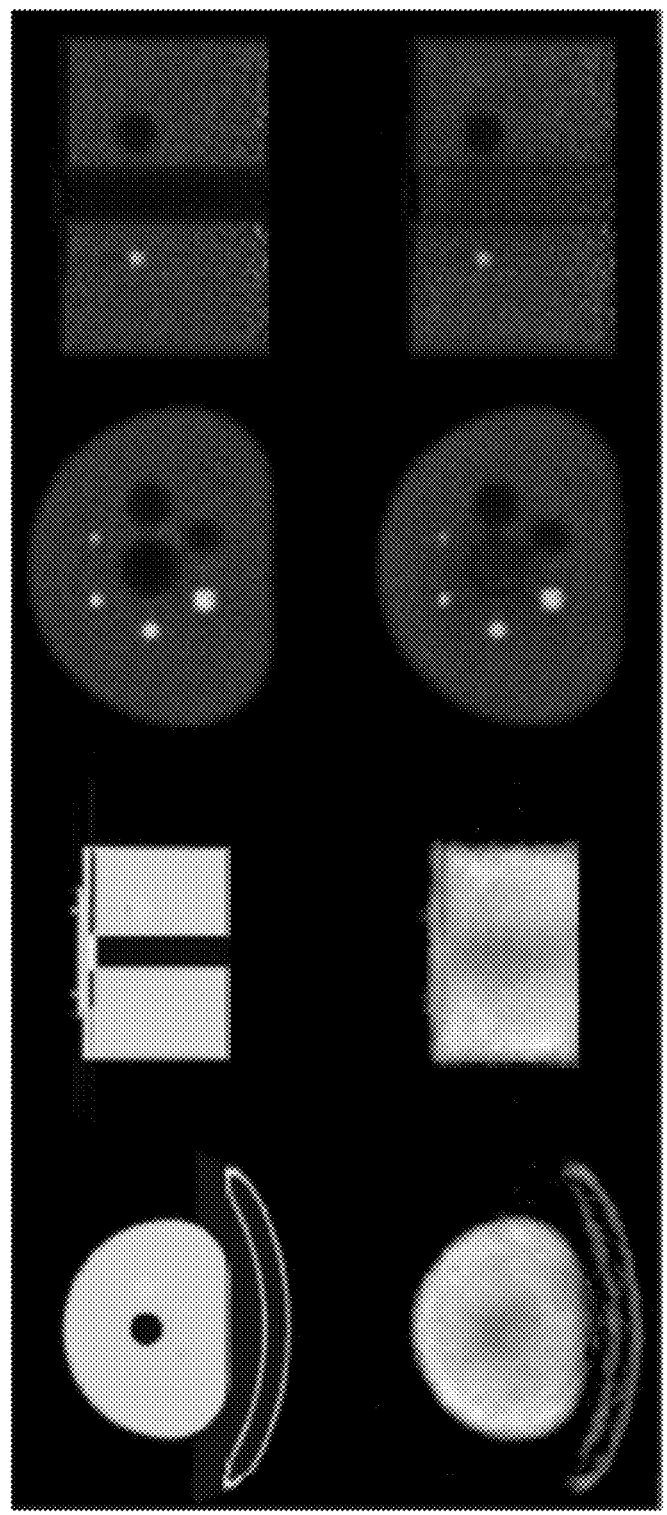
FIG. 12 shows attenuation maps derived from CT (top left) and from Lu-176 (bottom left). The images on right are PET emission data reconstructed with 10 minutes of emission data from ~2 mCi of Ge-68.

FIG. 12 shows the derived attenuation maps from the CT scan (top left) and from 30 minutes of transmission data from Lu-176 (bottom left). The images on the right are PET emission data reconstructed with 10 minutes of emission data from ~2 mCi of Ge-68. From the attenuation maps, it is observed that the cold cylinder in the Lu-176 transmission image is not well resolved. The corresponding PET emission images show some artifacts that come from having residual values in the cylinder that should be empty. This problem is not seen in the cold spheres because the spheres are all filled with epoxy. The cross talk between the emission data and the attenuation map puts activity in the region where there should be air and no activity.

E. Reconstruction of Emission Data with Lu-176 Transmission Data and MLACF

The attenuation maps created using the Lu-176 decays generally define the boundaries of the object being scanned fairly well. This information can help algorithms that estimate the attenuation and emission simultaneously such as MLACF. Using the Lu-176 attenuation maps, the scatter correction can also be performed on the object and the resulting scatter correction sinogram is inputted to the MLACF algorithm. The Lu-176 attenuation map can also be used as a starting image for the attenuation estimate of MLACF. The image quality phantom's data from the previous section was reconstructed using the MLACF algorithm with 5 iterations and 24. The resulting emission and attenuation maps are shown in FIG. 13.

Figure 13:
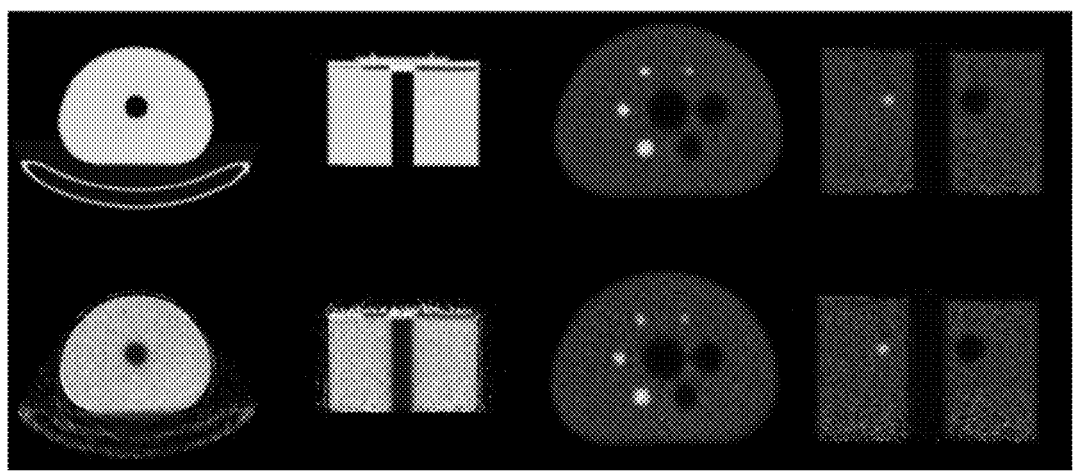
FIG. 13 shows attenuation maps derived from CT (top left) and estimated with MLACF (bottom left). Right images are the corresponding PET emission reconstructions.

The attenuation map shown in FIG. 13 is an estimate from MLACF and shows that the internal structures are well defined with respect to the attenuation map derived from just Lu-176 data (FIG. 11). There is some disadvantage to the MLACF attenuation map in that there is no estimation for the line of responses that have no emission data. The bed and the shell of the phantom are not recovered but do not seem to vary much from the starting image. The center hole is recovered and the emission reconstruction now has no emission contamination in the center cold region of the phantom as seen in FIG. 10. Although the images are similar, the comparison is challenging as the two emission images are reconstructed using different algorithms with different objective functions and convergence rates. A simple observation is that the uniform regions do appear uniform with no visible artifacts. The sphere recovery is similar between the two cases and the iterations were selected to try to achieve similar noise structure between the two cases.

The inventors have demonstrated that the Lu-176 decay that is already present in all lutetium-based PET scanners can be used as a transmission source. The technology that makes this work is the capability to measure time-of-flight of events detected by the PET scanner. With time-of-flight and some firmware modifications, simultaneous transmission and emission data can be collected.

It was shown that the transmission images acquired simultaneously could be used to assist the MLACF algorithms to produce PET emission images close to CT corrected PET emission images. The attenuation maps from Lu-176 events were also of enough quality to produce a scatter estimate that was necessary as an input for MLACF. Combining the two techniques yields a solution for PET imaging without the need of an external imaging modality to assist with the collection of attenuation information.

Figure 2:
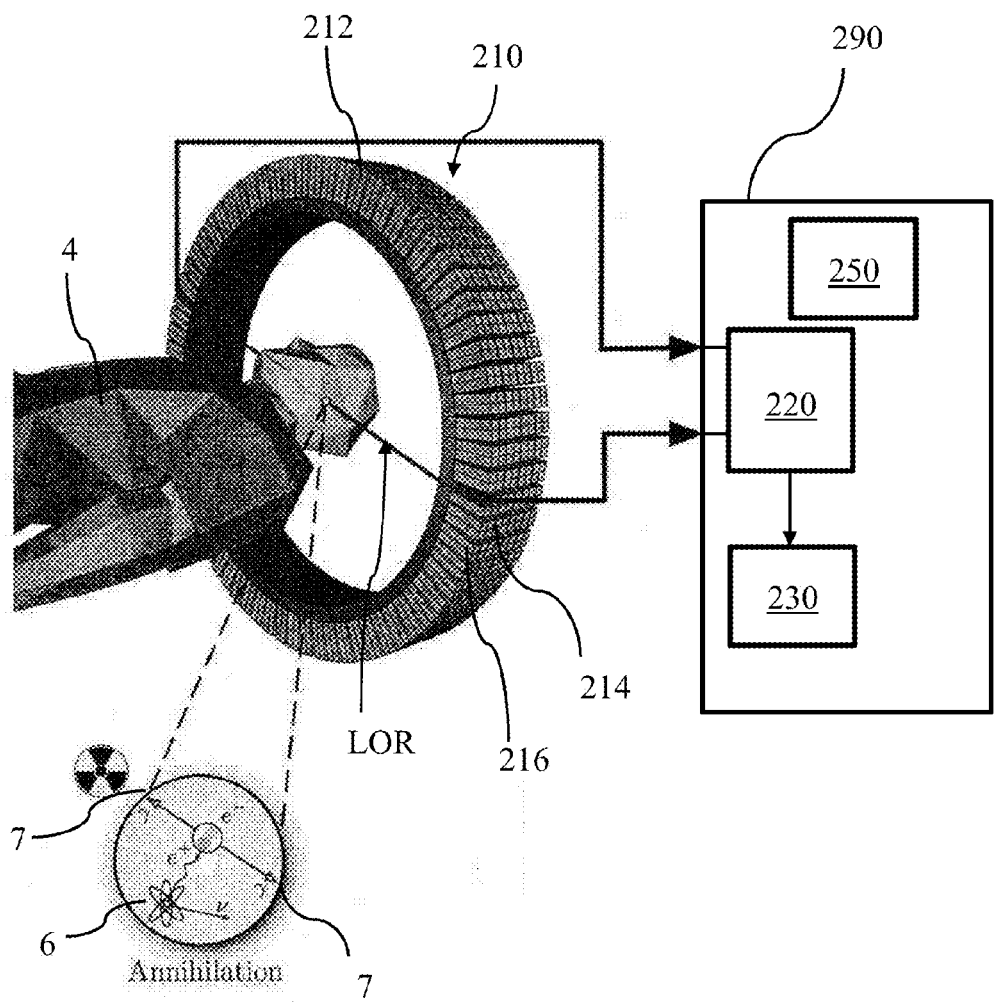
FIG. 2 is an illustration of a PET system.

FIG. 2 shows an example of a PET scanner system 200 that utilizes lutetium-based scintillators that may implement the method disclosed herein. A human subject 4 for PET scanning is shown positioned inside a gantry 210 of the PET scanner system 200. The gantry 210 comprises a plurality of radiation detector rings 212, with each detector ring comprising multiple lutetium-based scintillator crystals 216 and the associated radiation detectors 214. When a PET scan is performed, a positron-emitting radioisotope 6 is introduced into the human subject 4 on a metabolically active molecule. When a positron encounters an electron, both are annihilated, yielding two gamma photons 7 that travel in approximately opposite directions. The annihilation events are identified by a time coincidence between the detection of the two gamma photons by two oppositely disposed detectors, i.e., the gamma photon emissions are detected virtually simultaneously by each detector. When two oppositely traveling gamma photons strike corresponding oppositely disposed detectors to produce a time coincidence event, the photons identify a line of response (LOR) along which the annihilation event has occurred.

Images of metabolic activity in the human subject 4 (nuclear medical images) are reconstructed by computer analysis. The PET scanner system 200 includes a system controller 290 connected to and in communication with the detector rings 212. The PET scanner system 200 further comprises a data processing unit (event detection unit) 220 which determines and evaluates coincidence events generated by the pair of gamma rays and forwards this information to an image processing unit (computational unit) 230. Detector pairs associated to each LOR produce many coincidence events during a measurement. The PET scanner system 200 further includes at least one machine-readable storage medium 250 that is encoded with a computer program code which when executed by the system controller 290, the system controller performs various operational functions of the PET scanner system 200, e.g., processes 3200 and 3300.

According to an embodiment of the present disclosure, the machine-readable storage medium 250 of the PET scanner system 200 tangibly embodies a program of instructions (i.e. computer program code) executable by the system controller 290 such that when the program of instructions is executed by the system controller 290, the system controller performs various methods disclosed herein, e.g., processes 3200 or 3300 or a method for using lutetium-based scintillator crystals' 216 background beta decay emission in a PET scanner 200 as a transmission scan source for generating attenuation maps.

The apparatuses and processes are not limited to the specific embodiments described herein. In addition, components of each apparatus and each process can be practiced independent and separate from other components and processes described herein.

The previous description of embodiments is provided to enable any person skilled in the art to practice the disclosure. The various modifications to these embodiments will be readily apparent to those skilled in the art, and the generic principles defined herein may be applied to other embodiments without the use of inventive faculty. The present disclosure is not intended to be limited to the embodiments shown herein, but is to be accorded the widest scope consistent with the principles and novel features disclosed herein.

What is claimed is:

1. A method for operating a positron emission tomography (PET) scanner, the method comprising:
  acquiring, at a plurality of detector blocks of the PET scanner, emission data of gamma photons of a first energy level originating from annihilation events associated with radioactivity of a phantom in a field of view of the PET scanner;
  based on the emission data, generating an emission block-pair scattering model;
  acquiring counts of gamma photons of a second energy level originating from intrinsic background radiation of scintillator crystals of the detector blocks, without any phantom in the field of view, to provide blank scan data for the second energy level;
  generating a sinogram based on the blank scan data for the second energy level; and
  adding the emission block-pair scattering model to a scaled version of the sinogram, to yield a composite model.

2. The method of claim 1, wherein generating the emission block-pair scattering model includes:
  computing a histogram of counts of gamma photons of the first energy level detected at respective detector blocks over a range of incident angles;
  computing a probability of scatter for gamma photons of the first energy level as a function of scattering angle for each pair of detector blocks of the scanner, to obtain a set of scatter probabilities;
  computing a probability, for a given scattered gamma photon, of scattering to each detector block in a subset of the plurality of detector blocks, to obtain detector block impact probabilities; and
  scaling the computed histogram of counts by the scatter probabilities and the block impact probabilities, to generate the emission block-pair scattering model.

3. The method of claim 1, further comprising compensating for gamma photons of the first energy level scattering and being detected in an energy window corresponding to the second energy level, said compensating including scaling the composite model.

4. The method of claim 3, wherein the composite model is scaled based on transmission data of gamma photons of the second energy level, transmission data of gamma photons of a third energy level, the blank scan data for the second energy level, and blank scan data for the third energy level.

5. The method of claim 1, wherein each detector block impact probability is computed by calculating a solid angle of one detector block from a point of view of another detector block.

6. The method of claim 1, further comprising:
  acquiring transmission data of 307 keV gamma photons originating from intrinsic background radiation of a plurality of scintillator crystals in detector blocks of the PET scanner, when a radioactive phantom is in a field of view of the PET scanner, to provide 307 keV transmission data;

generating a first sinogram based on the 307 keV transmission data;

acquiring counts of 307 keV gamma photons originating from intrinsic background radiation of the scintillator crystals without any phantom in the field of view, to provide 307 keV blank scan data;

generating a second sinogram based on the 307 keV blank scan data; and automatically comparing the first and second sinograms to generate a scaling mask.

7. The method of claim 6, further comprising:

acquiring transmission data of 202 keV gamma photons originating from intrinsic background radiation of the scintillator crystals, when the radioactive phantom is in the field of view, to provide 202 keV transmission data;

generating a third sinogram based on the 202 keV transmission data; and scaling the third sinogram by the scaling mask to generate a set of scale factors.

8. The method of claim 7, further comprising:

acquiring counts of 202 keV gamma photons originating from intrinsic background radiation of the scintillator crystals without any phantom in the field of view, to provide 202 keV blank scan data;

generating a fourth sinogram based on the 202 keV blank scan data; and normalizing the fourth sinogram by a mean value of the fourth sinogram, to provide a 202 keV crystal efficiency map.

9. The method of claim 8, further comprising:

scaling a sum of the emission block-pair scattering model and a scaled version of the fourth sinogram by the 202 keV crystal efficiency map and the scale factors.

10. A method for operating a positron emission tomography (PET) seamier, the method comprising:

acquiring, at a plurality of detector blocks of the PET scanner, emission data of 511 keV gamma photons originating from annihilation events associated with radioactivity of a phantom in a field of view of the PET scanner;

based on the emission data, computing a histogram of counts of 511 keV gamma photons detected at respective detector blocks over a range of incident angles;

computing a probability of scatter for 511 keV gamma photons as a function of scattering angle for each pair of detector blocks of the scanner, to obtain a set of scatter probabilities;

for each detector block, computing a probability, for a given gamma photon scattering at said detector block, of scattering to each other detector block in a subset of the plurality of detector blocks, to provide detector block impact probabilities; and scaling the computed histogram of counts by the scatter probabilities and the block impact probabilities, to generate an emission block-pair scattering model.

11. A non-transitory machine-readable storage medium, tangibly embodying a program of instructions executable by a system controller to cause the system controller to perform operations comprising:

acquiring, at a plurality of detector blocks of a PET scanner, emission data of gamma photons of a first energy level originating from annihilation events associated with radioactivity of a phantom in a field of view of the PET scanner;

based on the emission data, generating an emission block-pair scattering model;

acquiring counts of gamma photons of a second energy level originating from intrinsic background radiation of scintillator crystals of the detector blocks, without any phantom in the field of view, to provide blank scan data for the second energy level;

generating a sinogram based on the blank scan data for the second energy level; and adding the emission block-pair scattering model to a scaled version of the sinogram, to yield a composite model.

12. The storage medium of claim 11, wherein generating the emission block-pair scattering model includes:

computing a histogram of counts of gamma photons of the first energy level detected at respective detector blocks over a range of incident angles;

computing a probability of scatter for gamma photons of the first energy level as a function of scattering angle for each pair of detector blocks of the scanner, to obtain a set of scatter probabilities;

computing a probability, for a given scattered gamma photon, of scattering to each detector block in a subset of the plurality of detector blocks, to obtain detector block impact probabilities; and scaling the computed histogram of counts by the scatter probabilities and the block impact probabilities, to generate the emission block-pair scattering model.

13. The storage medium of claim 11, wherein the instructions are further executable by the system controller to cause the system controller to perform operations comprising:

compensating for gamma photons of the first energy level scattering and being detected in an energy window corresponding to the second energy level, said compensating including scaling the composite model.

14. The storage medium of claim 13, wherein the instructions are executable to cause the system controller to scale the composite model based on transmission data of gamma photons of the second energy level, transmission data of gamma photons of a third energy level, the blank scan data for the second energy level, and blank scan data for the third energy level.

15. A non-transitory machine-readable storage medium, tangibly embodying a program of instructions executable by a system controller to cause the system controller to perform operations comprising:

acquiring, at a plurality of detector blocks of a PET scanner, emission data of 511 keV gamma photons originating from annihilation events associated with radioactivity of a phantom in a field of view of the PET scanner;

based on the emission data, computing a histogram of counts of 511 keV gamma photons detected at respective detector blocks over a range of incident angles;

computing a probability of scatter for 511 keV gamma photons as a function of scattering angle for each pair of detector blocks of the scanner, to obtain a set of scatter probabilities;

for each detector block, computing a probability, for a given gamma photon scattering at said detector block, of scattering to each other detector block in a subset of the plurality of detector blocks, to provide detector block impact probabilities; and scaling the computed histogram of counts by the scatter probabilities and the block impact probabilities, to generate an emission block-pair scattering model.

16. The storage medium of claim 15, wherein the instructions are executable to cause the system controller to compute each detector block impact probability by calculating a solid angle of one detector block from a point of view of another detector block.

17. The storage medium of claim 15, wherein the instructions are further executable by the system controller to cause the system controller to perform operations comprising:

acquiring transmission data of 307 keV gamma photons originating from intrinsic background radiation of a plurality of scintillator crystals in detector blocks of the PET scanner, when a radioactive phantom is in a field of view of the PET scanner, to provide 307 keV transmission data;

generating a first sinogram based on the 307 keV transmission data;

acquiring counts of 307 keV gamma photons originating from intrinsic background radiation of the scintillator crystals without any phantom in the field of view, to provide 307 keV blank scan data;

generating a second sinogram based on the 307 keV blank scan data; and automatically comparing the first and second sinograms to generate a scaling mask.

18. The storage medium of claim 17, wherein the instructions are further executable by the system controller to cause the system controller to perform operations comprising:

acquiring transmission data of 202 keV gamma photons originating from intrinsic background radiation of the scintillator crystals, when the radioactive phantom is in the field of view, to provide 202 keV transmission data;

generating a third sinogram based on the 202 keV transmission data; and scaling the third sinogram by the scaling mask to generate a set of scale factors.

19. The storage medium of claim 18, wherein the instructions are further executable by the system controller to cause the system controller to perform operations comprising:

acquiring counts of 202 keV gamma photons originating from intrinsic background radiation of the scintillator crystals without any phantom in the field of view, to provide 202 keV blank scan data;

generating a fourth sinogram based on the 202 keV blank scan data; and normalizing the fourth sinogram by a mean value of the fourth sinogram, to provide a 202 keV crystal efficiency map.

20. The storage medium of claim 19, wherein the instructions are further executable by the system controller to cause the system controller to perform operations comprising:

scaling a sum of the emission block-pair scattering model and a scaled version of the fourth sinogram by the 202 keV crystal efficiency map and the scale factors.

* * * * *